United States Patent
Hyde et al.

(10) Patent No.: US 9,608,862 B2
(45) Date of Patent: Mar. 28, 2017

(54) FREQUENCY ACCOMMODATION

(71) Applicant: Elwha LLC, Bellevue, WA (US)

(72) Inventors: Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 400 days.

(21) Appl. No.: 13/842,040

(22) Filed: Mar. 15, 2013

(65) Prior Publication Data

US 2014/0269414 A1    Sep. 18, 2014

(51) Int. Cl.
| | | |
|---|---|---|
| *H04W 72/00* | (2009.01) | |
| *H04L 12/24* | (2006.01) | |
| *H01Q 1/24* | (2006.01) | |
| *H04W 16/28* | (2009.01) | |
| *H01Q 3/26* | (2006.01) | |
| *H01Q 15/00* | (2006.01) | |

(52) U.S. Cl.
CPC ......... *H04L 41/0803* (2013.01); *H01Q 1/241* (2013.01); *H01Q 3/26* (2013.01); *H01Q 15/0086* (2013.01); *H04W 16/28* (2013.01)

(58) Field of Classification Search
CPC . H04W 24/00; H04W 26/28; H04M 1/72519; H04L 1/06; H04L 14/06
USPC .................. 455/562.1, 550.1, 452.1; 370/334
See application file for complete search history.

(56) References Cited

U.S. PATENT DOCUMENTS

| | | |
|---|---|---|
| 5,347,286 A | 9/1994 | Babitch |
| 5,515,059 A | 5/1996 | How et al. |
| 6,122,524 A | 9/2000 | Goerke |
| 6,571,097 B1 | 5/2003 | Takai |
| 6,954,180 B1 | 10/2005 | Braun et al. |
| 6,980,782 B1 | 12/2005 | Braun et al. |
| 7,068,234 B2 | 6/2006 | Sievenpiper |
| 7,106,715 B1 | 9/2006 | Kelton et al. |
| 7,688,306 B2 | 3/2010 | Wehrenberg et al. |

(Continued)

FOREIGN PATENT DOCUMENTS

| | | |
|---|---|---|
| CN | 102790277 A | 11/2012 |
| EP | 1 124 391 A1 | 8/2001 |

(Continued)

OTHER PUBLICATIONS

Brown, Michael; "Meet 60Ghz Wi-Fi, the insanely fast future of wireless networking," PC World; http://www.pcworld.com/article/2030041/meet-60ghz-wi-fi-the-insanely-fast-future-of-wireless-networking.hmtl, Mar. 6, 2013.

(Continued)

*Primary Examiner* — Danh Le

(57) ABSTRACT

Disclosed herein are example embodiments for accommodating different frequencies. For certain example embodiments, at least one device, such as a wireless node, (i) may accommodate different attributes or characteristics of electromagnetic radiation at particular frequencies or (ii) may accommodate multiple different frequencies with a same device. However, claimed subject matter is not limited to any particular described embodiments, implementations, examples, or so forth.

43 Claims, 14 Drawing Sheets

(56) References Cited

U.S. PATENT DOCUMENTS

| | | |
|---|---|---|
| 7,911,386 B1 | 3/2011 | Itoh et al. |
| 7,978,063 B2 | 7/2011 | Baldus et al. |
| 8,159,399 B2 | 4/2012 | Dorsey et al. |
| 8,217,843 B2 | 7/2012 | Shtrom et al. |
| 8,280,427 B2 | 10/2012 | Wang et al. |
| 8,494,558 B2 | 7/2013 | Jonsson et al. |
| 8,548,525 B2 | 10/2013 | Wong et al. |
| 8,577,392 B1 | 11/2013 | Pai et al. |
| 8,618,937 B2 | 12/2013 | Rofougaran et al. |
| 8,792,414 B2 | 7/2014 | Kish |
| 2002/0147032 A1 | 10/2002 | Yoon et al. |
| 2003/0090418 A1 | 5/2003 | Howell |
| 2004/0198401 A1 | 10/2004 | Rodgers et al. |
| 2004/0204026 A1* | 10/2004 | Steer ............... H04W 4/04 455/550.1 |
| 2004/0259497 A1 | 12/2004 | Dent |
| 2005/0195103 A1 | 9/2005 | Davis et al. |
| 2005/0250543 A1 | 11/2005 | Thermond |
| 2006/0017692 A1 | 1/2006 | Wehrenberg et al. |
| 2006/0052112 A1 | 3/2006 | Baussi et al. |
| 2006/0148405 A1 | 7/2006 | Wu et al. |
| 2006/0232468 A1 | 10/2006 | Parker et al. |
| 2007/0063911 A1 | 3/2007 | Davidson et al. |
| 2008/0074307 A1 | 3/2008 | Boric-Lubecke et al. |
| 2008/0077326 A1 | 3/2008 | Funk et al. |
| 2008/0096566 A1 | 4/2008 | Brunner et al. |
| 2008/0242354 A1 | 10/2008 | Rofougaran |
| 2008/0258971 A1 | 10/2008 | Nichols et al. |
| 2008/0274712 A1 | 11/2008 | Rofougaran |
| 2008/0304425 A1 | 12/2008 | Karaoguz |
| 2008/0311851 A1 | 12/2008 | Hansen et al. |
| 2009/0047950 A1 | 2/2009 | Doppler et al. |
| 2009/0117858 A1* | 5/2009 | Furrer ............... H04B 7/0871 455/78 |
| 2009/0212941 A1 | 8/2009 | Vock et al. |
| 2009/0325479 A1 | 12/2009 | Chakrabarti et al. |
| 2010/0027518 A1 | 2/2010 | Wang |
| 2010/0080177 A1 | 4/2010 | Rofougaran |
| 2010/0177664 A1* | 7/2010 | Thoumy ............... H04B 7/0617 370/254 |
| 2010/0188331 A1 | 7/2010 | Wehrenberg et al. |
| 2010/0194655 A1 | 8/2010 | Cook |
| 2010/0194663 A1 | 8/2010 | Rothwell et al. |
| 2010/0211777 A1* | 8/2010 | Ishihara ............... H04W 12/02 713/166 |
| 2010/0231453 A1 | 9/2010 | Shinkai et al. |
| 2010/0231473 A1 | 9/2010 | Shtrom et al. |
| 2010/0279751 A1 | 11/2010 | Pourseyed et al. |
| 2010/0297953 A1 | 11/2010 | Rofougaran |
| 2010/0309872 A1 | 12/2010 | Amini et al. |
| 2011/0009105 A1 | 1/2011 | Lee et al. |
| 2011/0063168 A1 | 3/2011 | Skarp |
| 2011/0090113 A1 | 4/2011 | Fenton |
| 2011/0105184 A1 | 5/2011 | Piirainen et al. |
| 2011/0143746 A1 | 6/2011 | Lehser |
| 2011/0151931 A1 | 6/2011 | Kish et al. |
| 2011/0175672 A1 | 7/2011 | Nguyen et al. |
| 2011/0201357 A1 | 8/2011 | Garrett et al. |
| 2011/0207444 A1 | 8/2011 | Hansen et al. |
| 2011/0210787 A1 | 9/2011 | Lee et al. |
| 2011/0250928 A1 | 10/2011 | Schlub et al. |
| 2011/0273359 A1 | 11/2011 | Tischer et al. |
| 2011/0298672 A1 | 12/2011 | Otto et al. |
| 2011/0305175 A1 | 12/2011 | Hethuin et al. |
| 2011/0306306 A1* | 12/2011 | Reed ............... H04B 17/0085 455/67.11 |
| 2012/0009942 A1 | 1/2012 | Zoubir |
| 2012/0014367 A1* | 1/2012 | Caillerie ............... H04B 7/0639 370/345 |
| 2012/0021693 A1 | 1/2012 | Wintzell et al. |
| 2012/0056784 A1 | 3/2012 | Xie et al. |
| 2012/0157120 A1 | 6/2012 | Hansen et al. |
| 2012/0182867 A1* | 7/2012 | Farrag ............... H04W 28/0236 370/230 |
| 2012/0194399 A1 | 8/2012 | Bily et al. |
| 2012/0202560 A1 | 8/2012 | Donaldson |
| 2012/0299772 A1 | 11/2012 | Shtrom et al. |
| 2013/0040655 A1* | 2/2013 | Keidar ............... H01Q 1/245 455/456.1 |
| 2013/0045759 A1* | 2/2013 | Smith ............... H04W 64/00 455/456.6 |
| 2013/0053061 A1 | 2/2013 | Kang et al. |
| 2013/0078908 A1 | 3/2013 | Smith |
| 2013/0176161 A1 | 7/2013 | Derham et al. |
| 2013/0184022 A1 | 7/2013 | Schmidt |
| 2013/0207806 A1 | 8/2013 | Lehmann |
| 2014/0051461 A1 | 2/2014 | Ranki et al. |
| 2014/0113671 A1 | 4/2014 | Schwengler |
| 2014/0120947 A1 | 5/2014 | Siomina |
| 2014/0153418 A1* | 6/2014 | Hariharan ............... H04W 24/10 370/252 |
| 2014/0211677 A1 | 7/2014 | Barbieri et al. |
| 2014/0274112 A1 | 9/2014 | Vitek et al. |
| 2014/0306843 A1* | 10/2014 | Merkel ............... G01R 29/10 342/385 |
| 2015/0030256 A1 | 1/2015 | Brady et al. |

FOREIGN PATENT DOCUMENTS

| | | |
|---|---|---|
| EP | 1 369 954 A3 | 10/2004 |
| EP | 1 562 257 A1 | 8/2005 |
| EP | 2 334 113 A1 | 6/2011 |
| KR | 2003-0019814 | 3/2003 |
| WO | WO 98/29968 A2 | 7/1998 |
| WO | WO 2007/090424 A1 | 8/2007 |
| WO | WO 2012/050614 A1 | 4/2012 |

OTHER PUBLICATIONS

Teral, Stephanie; "Mobile Spectrum, Annual Market Size and Forecasts Analysis", Infonetics Research Inc., Feb. 18, 2013, pp. i-23.

PCT International Search Report; International App. No. PCT/US2014/027741; Jul. 28, 2014; 5 pages.

Cisco, "Cisco Wireless LAN Controller Configuration Guide", Software Release 7.0; bearing a date of Jun. 2010; pp. 1-2, 4-68, 4-116, 7-17 and 12-34.

Nokia Corporation; "Linux Cross Reference"; Version 4.0; downloaded on May 28, 2015; pp. 1-24; Copyright © 2009 Nokia Corporation.

European Patent Office, Supplementary European Search Report, Pursuant to Rule 62 EPC; App. No. EP 14 76 3930.6; Oct. 17, 2016; pp. 1-8.

* cited by examiner

| FIG. 1A | FIG. 1B | FIG. 1C | FIG. 1D |
| FIG. 1E | FIG. 1F | FIG. 1G | FIG. 1H |
| FIG. 1I | FIG. 1J | FIG. 1K | FIG. 1L |

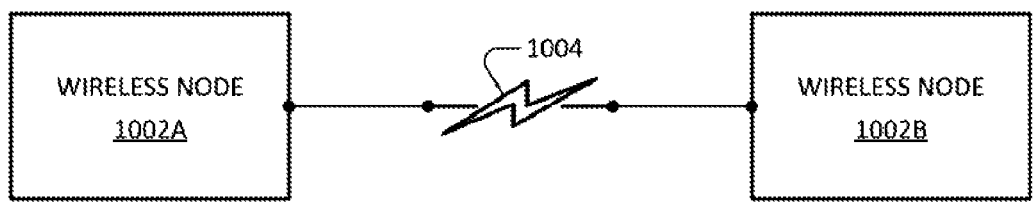

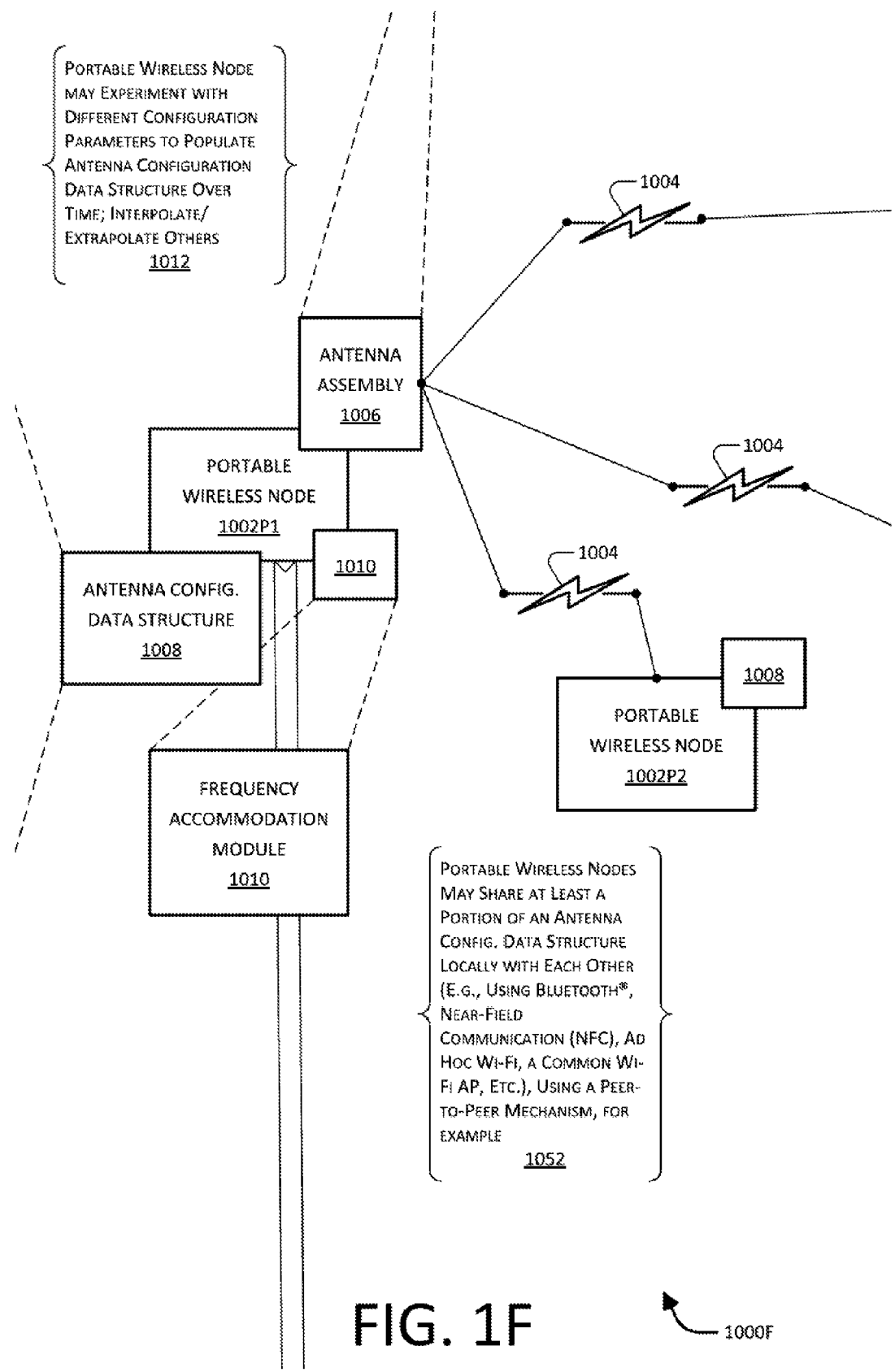

FREQUENCY ACCOMMODATION

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIGS. 1B-1L are individual schematic diagrams that may be combined to form a joint schematic diagram illustrating implementations for accommodating one or more different frequencies in a wireless environment in accordance with certain example embodiments.

DETAILED DESCRIPTION

Figure 1:
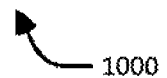
FIG. 1 is a block diagram indicative of a spatial relationship or interconnectedness of drawing sheets that respectively correspond to FIGS. 1A-1L, which together depict at least an enviro-system related to certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

For certain example embodiments, one or more wireless communication parameters may be adopted by a mobile device based at least partially on a physical state of a mobile device to strengthen, enhance, improve, or a combination thereof, etc. a communication channel between a mobile device and another wireless device, such as a base station. Additionally or alternatively, a physical state of (e.g., a location of or an orientation of) a mobile device may be altered to strengthen, enhance, improve, or a combination thereof, etc. a communication channel between a mobile device and an another device, such as a base station (e.g., orientation of at least one communicating device may be altered to strengthen, enhance, improve, or a combination thereof, etc. a communication channel between/among one or more wireless devices). However, claimed subject matter is not limited to any particular described embodiments, implementations, examples, etc.

For certain example embodiments, a physical state of a mobile device may include a spatial location of the mobile device or an orientation of the mobile device. For certain example implementations, a spatial location (e.g., which may be merged with or incorporated into or linked to 3-D mapping data, including those of buildings) may be represented with a geographical position of the mobile device (e.g., with regard to a point on the earth) or an elevation of the mobile device (e.g., with regard to a height above the earth). For certain example implementations, an orientation may be represented with Euler angles/rotations or pitch/roll/yaw in 3-D Euclidean space. However, claimed subject matter is not limited to any particular described embodiments, implementations, examples, etc.

For certain example embodiments, one or more wireless communication parameters, such as one or more antenna assembly configuration parameters, may include, but are not limited to the following. First, an antenna element set may be selected from among multiple antenna elements of an antenna array. Second, a particular phase or delay may be applied to each antenna element of a selected set of antenna elements. Third, a particular power may be applied to each antenna element of a selected set of antenna elements. Fourth, a phased array antenna (e.g., which may be formed from multiple antenna elements comprising or including a single dipole) may include multiple antenna elements that are driven with particular signal values. For instance, different elements (e.g., if an element is covered/blocked), phases/delays, power, or a combination thereof, etc. may be applied to input/output connections of a phased array antenna (e.g., to establish or form a beam). Antennas, including but not limited to, antenna arrays or phased arrays, may comprise or be formed/constructed using meta-materials. Fifth, a frequency of wireless signal(s) coupled to/from an antenna may be adjusted. Sixth, a frequency band and/or wireless communication standard employed may be altered, including but not limited to using a different antenna. However, claimed subject matter is not limited to any particular described embodiments, implementations, examples, etc.

FIG. 1 is a block diagram 1000 indicative of a spatial relationship or interconnectedness of drawing sheets that respectively correspond to FIGS. 1A-1L, which together depict at least an enviro-system related to certain example embodiments. For certain example embodiments, a wireless device, such as a mobile phone or tablet, may communicate wirelessly with another wireless node using one or more techniques or apparatuses so as to accommodate particular frequencies or frequency bands or different frequencies or communication standards. For certain example implementations, a wireless device may create or utilize at least one data structure that associates one or more conditions with one or more antenna assembly configuration parameters. Accordingly, one or more appropriate antenna assembly configuration parameters may be used or activated by a given wireless device without the given wireless device determining (e.g., because they have been determined by a different wireless node) or contemporaneously determining (e.g., because they were previously determined by the wireless device) antenna assembly configuration parameters that are appropriate for current conditions. However, claimed subject matter is not limited to any particular described embodiments, implementations, examples, etc.

Figure 1A:
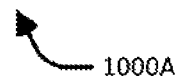
FIG. 1A is a schematic diagram of example wireless nodes in accordance with certain example embodiments.

FIG. 1A is a schematic diagram 1000A of example wireless nodes in accordance with certain example embodiments. As shown in FIG. 1, by way of example but not limitation, schematic diagram 1000A may include at least a (first) wireless node 1002A, at least a (second) wireless node 1002B, or at least one wireless link 1004. For certain example embodiments, any particular wireless node 1002A or wireless node 1002B may be, comprise, or include: at least one portable wireless device or at least one fixed wireless device. A given wireless node frequency accommodation scenario may be considered, analyzed, operated, viewed, or a combination thereof, etc. from a perspective of at least one portable wireless node or at least one fixed wireless node. Disclosure herein or in the accompany drawings, which form a part hereof, that is directed to a portable wireless node may additionally or alternatively be applicable to a fixed wireless node, and vice versa, unless context dictates otherwise. However, claimed subject matter is not limited to any particular described embodiments, implementations, examples, etc.

For certain example embodiments, a portable wireless node (e.g., a portable wireless node 1002PWN (e.g., of FIG. 2)) may comprise or include a mobile device, a mobile phone, a tablet, a slate computer, a phablet, a portable gaming device, a smartphone, a notebook computer, a mobile repeater, a user equipment (UE), a mobile station (MS), a laptop computer, a hand-held radio, a walker-talkie, a roving transceiver (e.g., an access point or base station operating from a ground or aerial vehicle, an electronic device having wireless communication capabilities that is typically moved (e.g., translationally, rotationally, etc.) during usage or on a regular basis such as daily, a combination thereof, or so forth. Additionally or alternatively, a fixed wireless node (e.g., a fixed wireless node 1002FWN (e.g., of FIG. 3)) may comprise or include an access point, a base station, a femto cell controller, a desktop computer, a fixed repeater, a cellular tower, an apparatus having wireless capabilities that is typically stationary during usage or installed in one location for an extended period of time such as months or years, a combination thereof, or so forth. However, claimed subject matter is not limited to any particular described embodiments, implementations, examples, etc.

For certain example embodiments, wireless link 1004 may be transmitted, received, propagated, generated, processed, or a combination thereof, etc. in accordance with any one or more of a number of different wireless communication standards, channel access methods, frequencies, modulations, some combination thereof, or so forth. Examples of wireless communication standards may include, but are not limited to, IEEE 802.11 Standards (e.g., 802.11-1997, 802.11a, 802.11b, 802.11g, 802.11-2007, 802.11n, 802.11-2012, 802.11ac, 802.11ad, or a combination thereof, etc.), WiMAX, AMPS, GSM (e.g., GPRS), EDGE, UMTS/UTRA (e.g., UTRA with a type of CDMA, HSPA, etc.), 3GPP (e.g., Evolved HSPA, Long Term Evolution (LTE), etc.), LTE Advanced, Bluetooth®, Near Field Communication (NFC), some combination thereof, or so forth. Examples of channel access methods may include, but are not limited to, DSSS, FDMA, OFDMA, TDMA, STDMA, SSMA, CDMA, SDMA, some combination thereof, or so forth. Examples of frequencies may include, but are not limited to, 13-14 MHz, 400 MHz, 800-900 MHz, 1700/1800/1900 MHz, 2100 MHz, 2500 MHz, 2.4 GHz, 5 GHz, 60 GHz, some combination thereof, or so forth. However, claimed subject matter is not limited to any particular described embodiments, implementations, examples, etc.

FIGS. 1B-1L are individual schematic diagrams 1000B-1000L that may be combined to form a joint schematic diagram illustrating implementations for accommodating one or more different frequencies in a wireless environment in accordance with certain example embodiments. As shown in FIGS. 1B-1L, by way of example but not limitation, schematic diagrams 1000A-1000L may include at least portable wireless nodes 1002P1 or 1002P2; at least fixed wireless nodes 1002F1, 1002F2, or 1002F3; at least multiple wireless links 1004; at least one antenna assembly 1006; at least one antenna configuration data structure 1008; at least one frequency accommodation module 1010; at least multiple example explanatory descriptions 1012, 1022, 1024, 1026, 1030, 1032, 1038, 1040, 1042, 1044, 1046, 1048, 1050, 1052, 1054, 1056, 1058, 1060, 1062, 1064, 1066, or 1068; at least one telecommunications node 1014; at least one internet node 1016; at least one network 1018; one or more antenna junctions 1020; at least one data signal antenna junction 1020*d*; one or more control signal antenna junctions 1020*c*; at least one beam pattern 1028; at least one arrow 1030*; at least one arrow 1032*; at least one user 1034; at least one (e.g., wearable) auxiliary relay item 1036; at least one antenna assembly configuration parameter 1070; at least one condition 1072; one or more conditions with associated one or more antenna configuration parameters 1074; one or more associations of conditions and antenna configuration parameters 1076; at least one meta-material element 1078; or at least one resonant frequency adjustor 1080.

With reference to FIG. 1F, a portable wireless node 1002P1. As illustrated, portable wireless node 1002P1 may include at least one antenna assembly 1006, at least one antenna configuration data structure 1008, or at least one frequency accommodation module 1010. For certain example embodiments, a frequency accommodation module 1010 may enable a device, such as a portable wireless node 1002P1, to implement one or more operations as described herein or illustrated in the accompanying drawings. By way of example but not limitation, a frequency accommodation module 1010 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

Figure 1B:
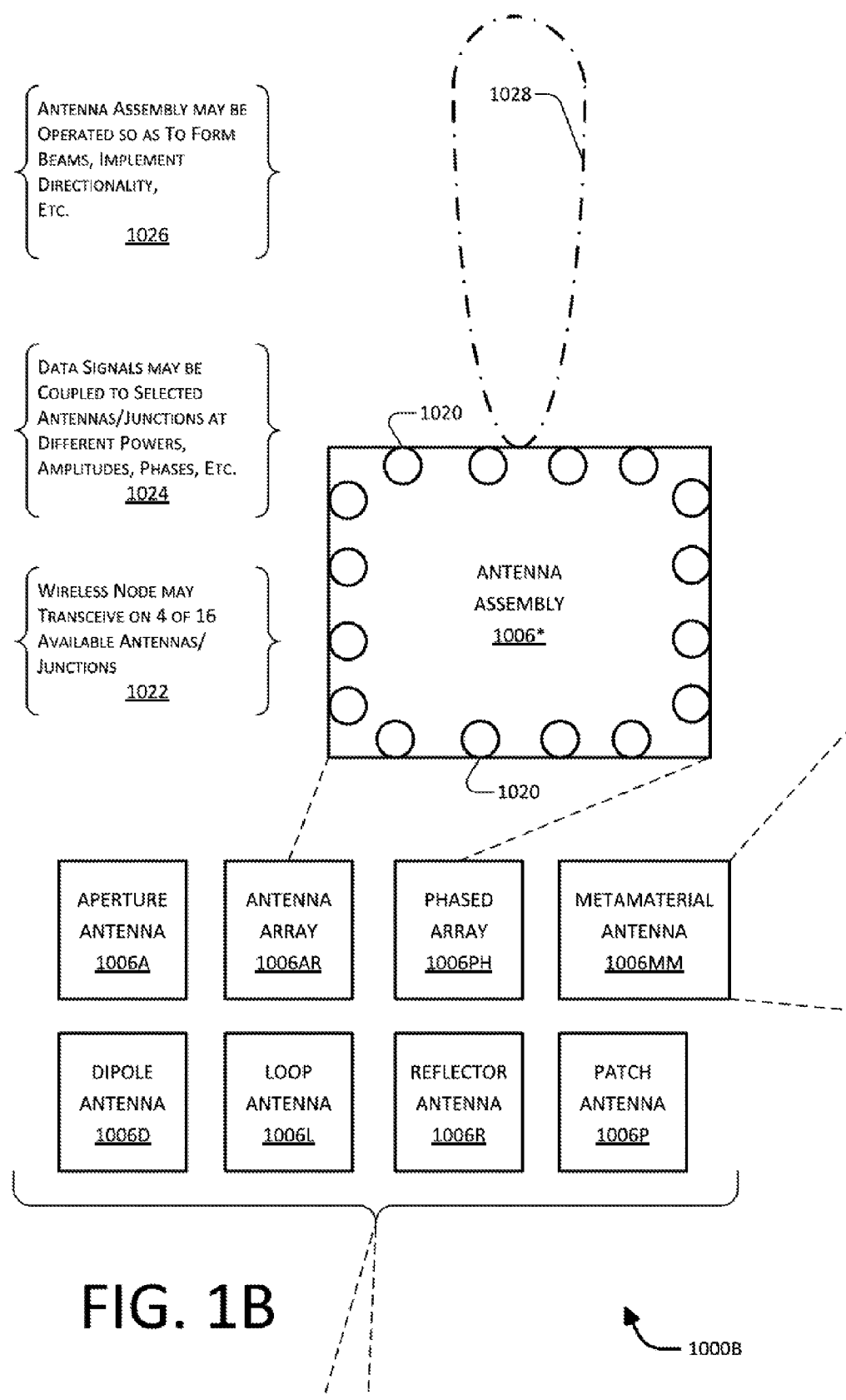

With reference to FIG. 1B, an antenna assembly 1006 may comprise or include one or more antennas formed from any one or more antenna types. For certain example embodiments, examples of antenna types may include, but are not limited to, a dipole antenna 1006D, a loop antenna 1006L, a reflector antenna 1006R, a patch antenna 1006P, an aperture antenna 1006A, an antenna array 1006AR, a phased array 1006PH, a meta-material antenna 1006MM, some combination thereof, or so forth. However, claimed subject matter is not limited to any particular described embodiments, implementations, examples, etc.

With continuing reference to FIG. 1B, an example of antenna array 1006AR or a phased array antenna 1006PH is depicted at antenna assembly 1006*. For certain example embodiments, antenna assembly 1006* may include one or more antenna junctions 1020. As shown by way of example only, antenna assembly 1006* may include sixteen (16) antenna junctions 1020. Antenna junctions 1020 may comprise or include signal inputs, data inputs, control inputs, signal outputs, data outputs, control outputs, antenna connectors, antenna leads, antenna pads, some combination thereof, or so forth. For certain example implementations, directionality of an emanating electromagnetic signal may be accomplished by applying particular signals to one or more antenna junctions 1020. Examples of particular signals that may be applied to antenna junctions 1020 may include, but are not limited to, amplitude differences, phase shifts, time delays, selected ones of antenna junctions 1020 (e.g., a selected four of 16 available antenna junctions), current changes, voltage changes, frequency differences, some combination thereof, or so forth. Additionally or alternatively, different antennas or antenna elements, including but not limited to subsets of available antennas or antenna elements, may be selected for usage during reception or transmission. Different antenna configurations (e.g., which may be organized as one or more antenna assembly configuration parameters 1070 (e.g., of FIG. 1E)) may be utilized to realize different directionalities, distances, focuses, or combination thereof, etc. for receiving or transmitting with electromagnetic radiation. By way of example only, an antenna beam pattern 1028 may be formed using an antenna assembly 1006 such as an antenna assembly 1006* if a portable wireless node 1002P1 (or wireless node 1002 generally) adopts a given collection of antenna configuration parameters. However, claimed subject matter is not limited to any particular described embodiments, implementations, examples, etc.

Figure 1C:
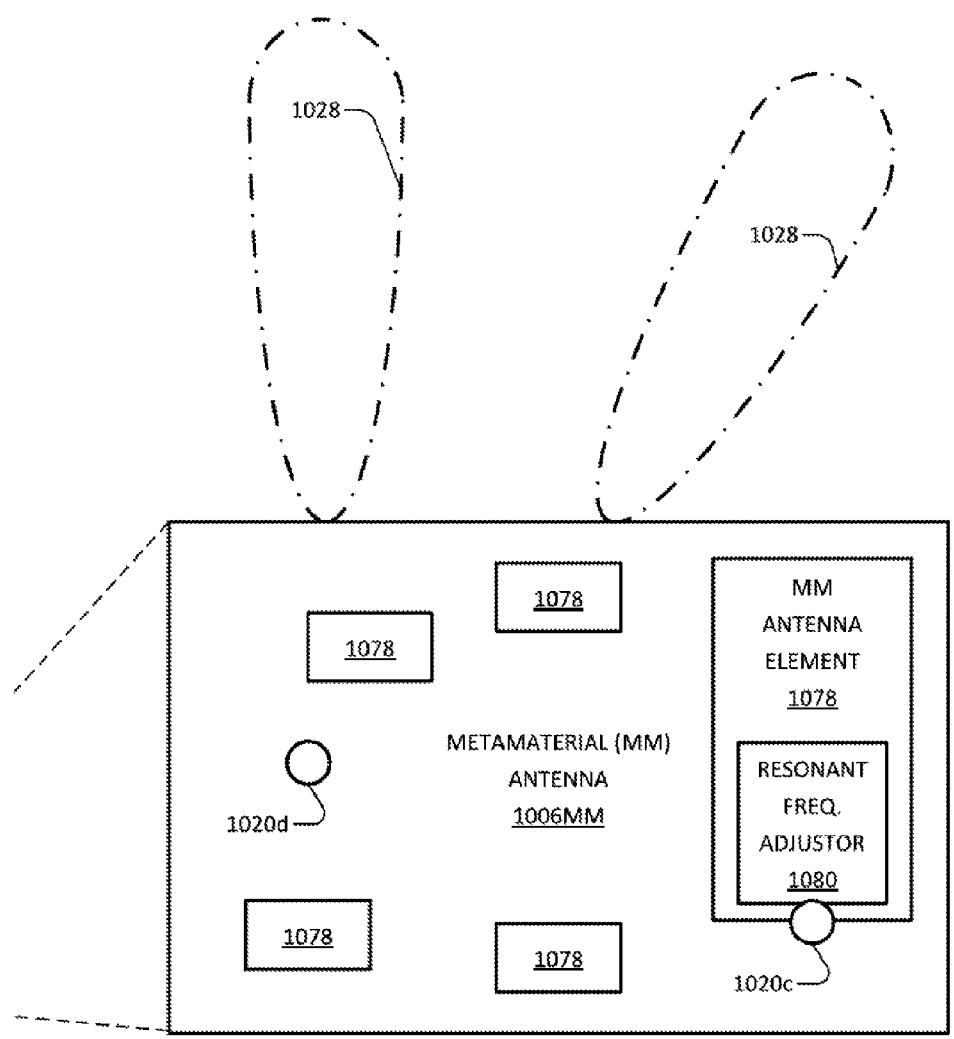

With reference to FIG. 1C, an example meta-material antenna 1006MM is illustrated with two beams 1028. Although two beams 1028 are shown in FIG. 1C (and one beam 1028 is shown in FIG. 1B), more or fewer beams 1028 with different shapes, sizes, or combination thereof, etc. than those that are illustrated may alternatively be implemented by a meta-material antenna 1006MM (or by an antenna array 1006AR or phased array 1006PH). As illustrated in FIG. 1C, but by way of example only, a meta-material antenna 1006MM may include at least one data signal antenna junction 1020*d* or one or more meta-material elements 1078. As further illustrated, but by way of example only, a given meta-material element 1078 may include at least one resonant frequency adjustor 1080 or at least one control signal antenna junction 1020*c*. However, claimed subject matter is not limited to any particular described embodiments, implementations, examples, etc.

For certain example embodiments, from a transmission perspective (e.g., an inverse perspective for receptions may be analyzed analogously), a data signal of at least one frequency may be introduced to a meta-material antenna 1006MM. A data signal may emanate from meta-material antenna 1006MM via one or more meta-material elements 1078. A given meta-material element 1078 may emanate a data signal responsive at least partly to the data signal's frequency or responsive to a resonant frequency of the given meta-material element 1078. In operation, a resonant frequency adjustor 1080 may adjust a resonant frequency of an associated meta-material element 1078. A control signal may be applied to a control signal antenna junction 1020*c* to control a corresponding resonant frequency adjustor 1080 and thereby affect a resonant frequency of an associated meta-material element 1078. However, claimed subject matter is not limited to any particular described embodiments, implementations, examples, etc.

For certain example embodiments, at least one data signal antenna junction 1020*d* may be coupled to a waveguide (e.g., a metal strip or layer) that provides an incoming data signal to one or more meta-material elements 1078 across a meta-material antenna 1006MM. For certain example implementations, a meta-material element 1078 may comprise or include a slot that functions to enable electromagnetic emanations from a meta-material antenna 1006MM. (Additionally or alternatively, a meta-material element 1078 may emanate from a positive structure instead of from a gap or slit in a larger structure.) A particular meta-material element 1078 may include or be associated with a resonant frequency adjustor 1080. A resonant frequency adjustor 1080 may comprise or include, by way of example but not limitation, a liquid crystal material, a ferromagnetic material, some combination thereof, or so forth. By way of example only, a liquid crystal material may react to application of a voltage (e.g., with a control signal via a control signal antenna junction 1020*c*) by altering a percentage of crystals that are aligned. A change in voltage can change a percentage of aligned crystals. A percentage of aligned crystals may change a resonant frequency of a meta-material of a meta-material element 1078. Consequently, a change in voltage at a control signal antenna junction 1020*c* may change a resonant frequency of a meta-material element 1078. If a data signal traveling along a waveguide contacts a given meta-material element 1078, an amount of data signal (e.g., an amplitude of the data signal) that is emanated from a given meta-material element 1078 may increase as a frequency of the data signal more closely matches a resonant frequency of the given meta-material element 1078 as set or established by a corresponding resonant frequency adjustor 1080. Accordingly, for certain example implementations, an amplitude of an emanated data signal may differ at different points/positions of a meta-material antenna 1006MM by changing a resonant frequency adjustor 1080 of a meta-material element 1078 at respective different points/positions. Emanating different amplitude signals from different positions of meta-material antenna 1006MM, via constructive and destructive combinations, enables formation of one or more beams 1028. For certain example implementations, a given meta-material antenna 1006MM may operate (e.g., form beams) in different frequency bands by having one or more meta-material elements 1078 that are constructed or tuned to have one or more resonant frequencies in two or more different frequency bands. However, claimed subject matter is not limited to any particular described embodiments, implementations, examples, etc.

Figure 1D:
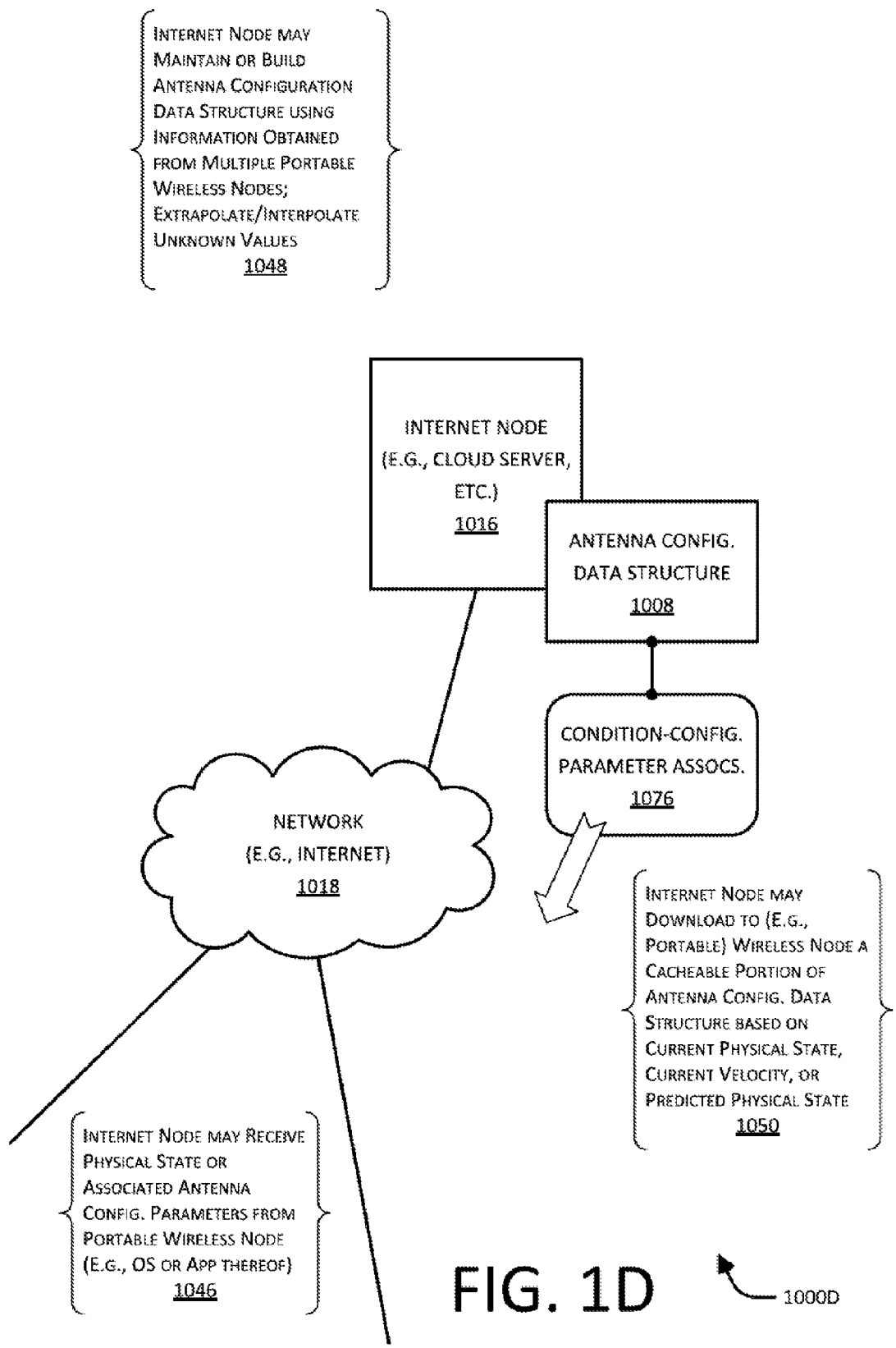
Figure 1E:
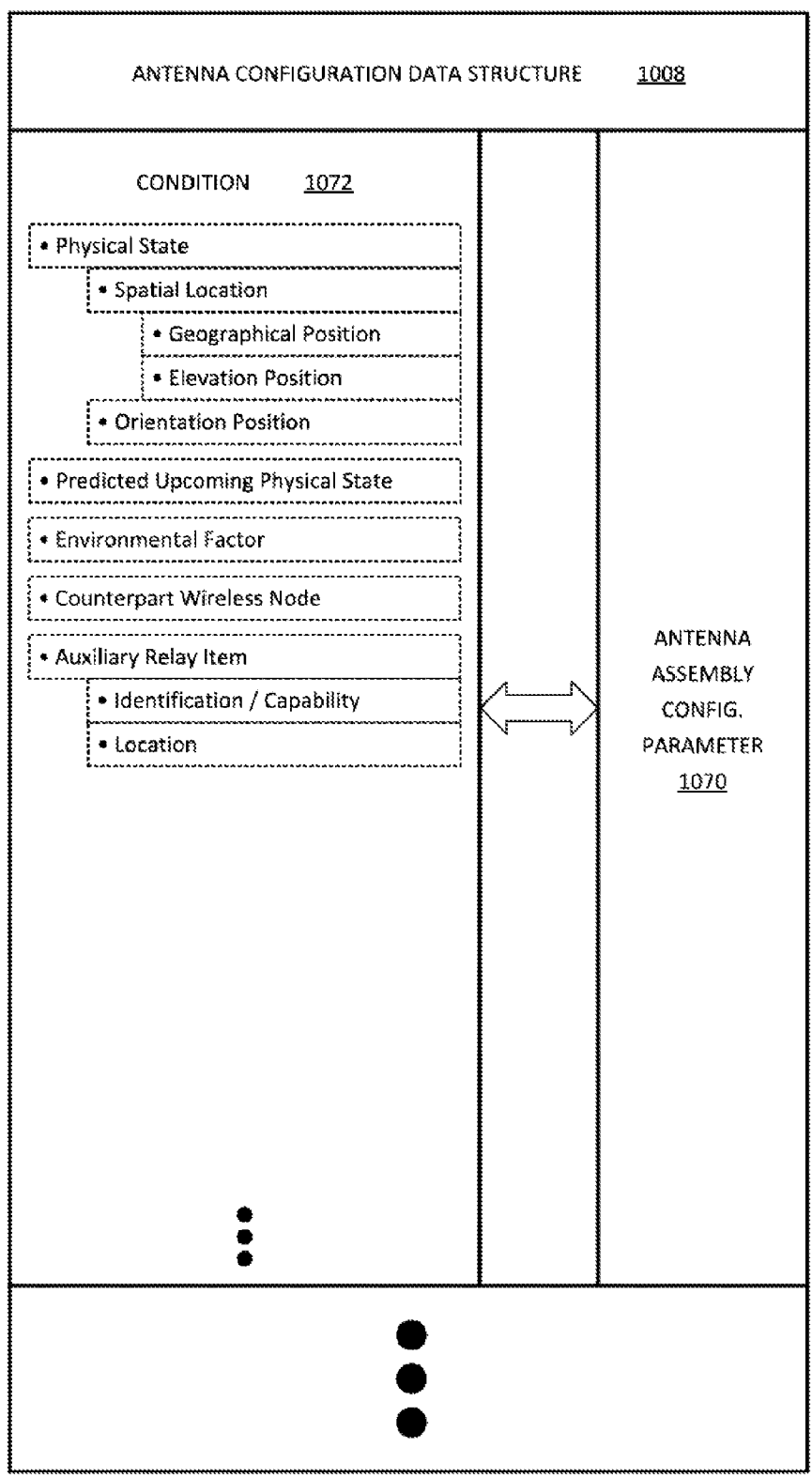

With reference to FIG. 1E, an antenna configuration data structure 1008 is illustrated. For certain example embodiments, one or more conditions 1072 may be associated with one or more antenna assembly configuration parameters 1070. Examples of conditions 1072 may include, but are not limited to, a physical state of a wireless node, a predicted upcoming physical state, an environmental factor, a counterpart wireless node (e.g., a wireless node with which communication is to be engaged), an auxiliary relay item, some combination thereof, or so forth. Additional or alternative condition 1072 examples are described herein below. For certain example implementations, a physical state may include a spatial location (e.g., which may change with a translational movement) or an orientation position (e.g., which may change with a rotational movement) (e.g., represented by Euler angles, Tait-Bryan angles, another parametrization, or a combination thereof, etc.). A spatial location may include a geographical position (e.g., location on an indoor or outdoor map, satellite positioning system (SPS) coordinates—such as GPS coordinates, distance plus direction with respect to a known location—such as a landmark or other wireless node, or a combination thereof, etc.), an elevation position (e.g., an altitude above the earth, a floor of a building, or a combination thereof, etc.), some combination thereof, or so forth. For certain example implementations, an auxiliary relay item field may include an identification/capability field (e.g., availability, description, identifying code, frequency band capability, transmit power capability, compatible standards, remaining battery power, or a combination thereof, etc.), a location field (e.g., placement on body, position relative to portable wireless node—such as direction or distance, or a combination thereof, etc.), some combination thereof, or so forth. However, claimed subject matter is not limited to any particular described embodiments, implementations, examples, etc.

With continuing reference to FIG. 1E, for certain example embodiments, an antenna configuration data structure 1008 may include one or more entries. An entry may have two or more fields that are linked or associated with one another. For example, a given entry may have a respective field corresponding to one or more conditions 1072 that is linked to or associated with a respective field corresponding to one or more antenna assembly configuration parameters 1070. However, claimed subject matter is not limited to any particular described embodiments, implementations, examples, etc.

With reference to FIG. 1F, portable wireless node 1002P1 may be in communication with a portable wireless node 1002P2, a fixed wireless node 1002F1, fixed wireless node 1002F2, some combination thereof, or so forth via at least one wireless link 1004. For certain example embodiments, portable wireless node 1002P1 may engage in wireless communication with a particular counterpart wireless node using at least one antenna assembly 1006 in accordance with one or more antenna assembly configuration parameters 1070 that are extracted from an antenna configuration data structure 1008 based on one or more conditions 1072 that are associated therewith. For certain example implementations, as indicated at description 1012, a portable wireless node 1002P1 may experiment with different antenna assembly configuration parameters 1070 to find suitable parameters to populate antenna configuration data structure 1008 over time (e.g., as portable wireless node 1002P1 experiences varying conditions 1072). To expand an antenna configuration data structure 1008 or increase a number of entries thereof that are populated with data, portable wireless node 1002P1 may interpolate or extrapolate some antenna assembly configuration parameters. However, claimed subject matter is not limited to any particular described embodiments, implementations, examples, etc.

For certain example embodiments, wireless communication parameters that are associated with a given physical state of a mobile device may be determined through current experimentation by a mobile device, current signaling from a base station or other counterpart wireless node, current signaling from a network source, at least a portion of an antenna configuration data structure 1008. However, claimed subject matter is not limited to any particular described embodiments, implementations, examples, etc.

For certain example embodiments, with respect to mobile device experimentation, one or more of the following options may be applied to determine a suitable combination of wireless communication parameters. Options may include, but are not limited to, (a) sets of antenna elements (e.g., different sets of 4 selected antenna elements from 16 total available antenna elements), (b) different directionalities of beams (e.g., such as particular cardinal directions or up—opposite gravitational forces), (c) different beam shapes (e.g., lengths, widths, perimeters, or a combination thereof, etc.), (d) different signal phases at respective antenna elements, (e) different signal delays at respective antenna elements, (f) different power levels, some combination thereof, or so forth. Additionally or alternatively, with regard to power, a wireless node may use relatively higher power for communication (e.g., transmitting signals) while using relatively lower power for investigation of appropriate wireless communication parameters (e.g., sniffing signals). However, claimed subject matter is not limited to any particular described embodiments, implementations, examples, etc.

For certain example embodiments, with respect to mobile device experimentation, a mobile device may employ a group of wireless communication parameters that have been determined via experimentation. Additionally or alternatively, a mobile device may store a group of (e.g., one or more suitable combinations) of wireless communication parameters for a given physical state of a mobile device in an antenna configuration data structure 1008 or send a group of wireless communication parameters for a given physical state of a mobile device to a network-side orchestrator of a data structure. However, claimed subject matter is not limited to any particular described embodiments, implementations, examples, etc.

For certain example embodiments, with respect to mobile device experimentation, a mobile device may schedule or initiate at least one experimentation round based at least partially on any of the following: (a) in the background while other automations progress, (b) at timed intervals or if a certain amount of time elapses, (c) if signal quality drops below a certain level, (d) if a certain amount of movement (e.g., translational, rotational, or a combination thereof, etc.) is detected (e.g., using an inertial measurement unit (IMU) or GPS unit), (e) at a known or determinable boundary for a physical state entry of an antenna configuration data structure 1008 (e.g., which may include a parameter-to-physical state data structure), (f) if a mobile device is approaching a known or determinable boundary for a physical state entry of an antenna configuration data structure 1008, (g) predictively (e.g., based at least partly on (i) predicting a certain amount of movement is soon to occur, (ii) predicting that a boundary crossing into a physical state that corresponds to a different physical state entry of an antenna configuration data structure 1008, or a combination thereof, etc.), some combination thereof, or so forth. However, claimed subject matter is not limited to any particular described embodiments, implementations, examples, etc.

For certain example embodiments, with respect to mobile device experimentation, experimentation may be constrained responsive to one or more conditional parameters. By way of example only, parameter options/possibilities to be tested may be constrained based at least partially on power usage. For instance, a mobile device may intend to enable wireless communication with at least one bases station, but limit power output for such wireless communication to a particular power level (e.g., 100 mW). A battery may set limits or establish specified guidelines that constrain power usage, including but not limited to constraining power usage/charge drain over time. Accordingly, an experimentation module may trade (i) a selection of wireless standard being used or (ii) frequency or bandwidth of searching, for example, (instead of or in addition to transmit power) with power drain. Moreover, as another example, a power constraint may be selectively applied based at least partly on time of day or predicted time until a battery will next be charged. For instance, whether or to what stringency a power constraint is applied may depend on a time of day. Accordingly, there may be a greater concern on battery drain earlier in a day as compared to later when recharging typically occurs (a typical temporal pattern of charging—such as around noon in a car as well as starting at around midnight with a wall outlet—may also or alternatively be considered). From an alternative perspective, a battery level may be considered as a condition 1072 for ascertaining at least one associated antenna assembly configuration parameter 1070 (e.g., if selecting a wireless communication mode—or a group of wireless communication parameters). However, claimed subject matter is not limited to any particular described embodiments, implementations, examples, etc.

For certain example embodiments, an antenna configuration data structure 1008 may have separate entries for, or otherwise denote a difference between, uplink versus downlink. Appropriate uplink and downlink communication parameters may differ because multipath may affect a mobile device more than a base station, because different frequencies may be assigned to uplink versus downlink communications, some combination thereof, or so forth. However, claimed subject matter is not limited to any particular described embodiments, implementations, examples, etc.

For certain example embodiments, with respect to receiving commands or data at a mobile device from a base station, a mobile device may cooperate with a base station to obtain one or more wireless communication parameters. First, a base station may send to a mobile device or a mobile device may receive from a base station one or more wireless communication parameters that the mobile device may adopt. Second, a base station may send to a mobile device or a mobile device may receive from a base station at least some reception data from a perspective of the base station for the mobile device to incorporate into an automation process ascertaining what wireless communication parameters are to be implemented. Third, a mobile device and a base station may negotiate to determine a direction of a wireless signal that enables a reflection of a wireless signal off of an object between the mobile device and the base station (e.g., a bank shot may be planned and implemented) to facilitate signal propagation between a mobile device and a base station. Conducting a signal bank shot may be facilitated by using, for example, a 3D map depicting walls, furniture, terrain, vehicles, people, etc. and one or more reflection coefficients for proximate objects that indicate how or to what extent signals of particular frequencies can be expected to reflect off of an object. Cooperation between two wireless nodes may encompass, for example, any one or more of the above. However, claimed subject matter is not limited to any particular described embodiments, implementations, examples, etc.

For certain example embodiments, with respect to using an antenna configuration data structure 1008, a wireless node 1002 may implement one or more of the following operations: (a) input a current or a predicted physical state of a wireless node, (b) extract one or more wireless communication parameters (e.g., at least one antenna assembly configuration parameter 1070) that are associated with an input physical state, or (c) apply one or more extracted wireless communication parameters to wireless node functionality (e.g., to operating an antenna assembly 1006 thereof). However, claimed subject matter is not limited to any particular described embodiments, implementations, examples, etc.

With reference to FIG. 1B, for certain example embodiments, a portable wireless node 1002P1 may utilize an antenna assembly 1006 in accordance with one or more antenna assembly configuration parameters 1070. For certain example implementations, as indicated at description 1022, a portable wireless node 1002P1 may transceive (e.g., transmit, receive, or a combination thereof, etc.) on four (4) of sixteen (16) available antenna junctions 1020 of antenna assembly 1006*. Selection of four antenna elements or patches may enable, for instance, a mobile phone to transmit at least primarily from one side of the mobile phone (e.g., toward a receiver, away from a head of a user, or a combination thereof, etc.). For certain example implementations, as indicated at description 1024, data signals (e.g., signals carrying information to be transmitted (or received)) may be coupled to selected antenna junctions (e.g., including connectors, leads, antennas, antenna patches, antenna elements, or a combination thereof, etc.) at different powers, at different amplitudes, with different phases, with different frequencies, some combination thereof, or so forth. For certain example implementations, as indicated at description 1026, a portable wireless node 1002P1 may operate an antenna assembly 1006\* so as to form a beam (e.g., an antenna beam pattern 1028), to focus a transmission or a reception capability in a desired direction, to transmit or receive in a desired frequency band, some combination thereof, or so forth. However, claimed subject matter is not limited to any particular described embodiments, implementations, examples, etc.

Figure 1G:
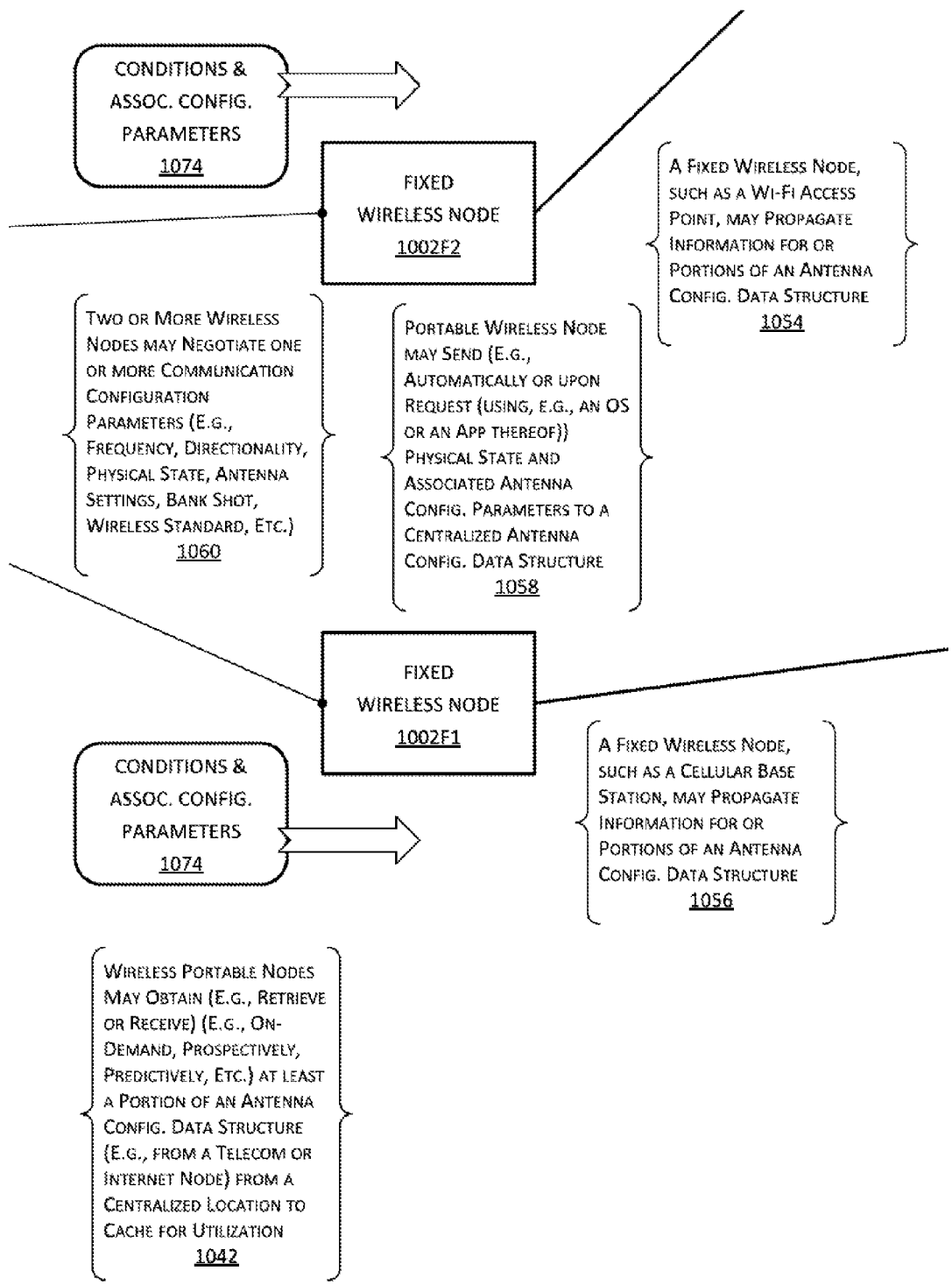
Figure 1H:
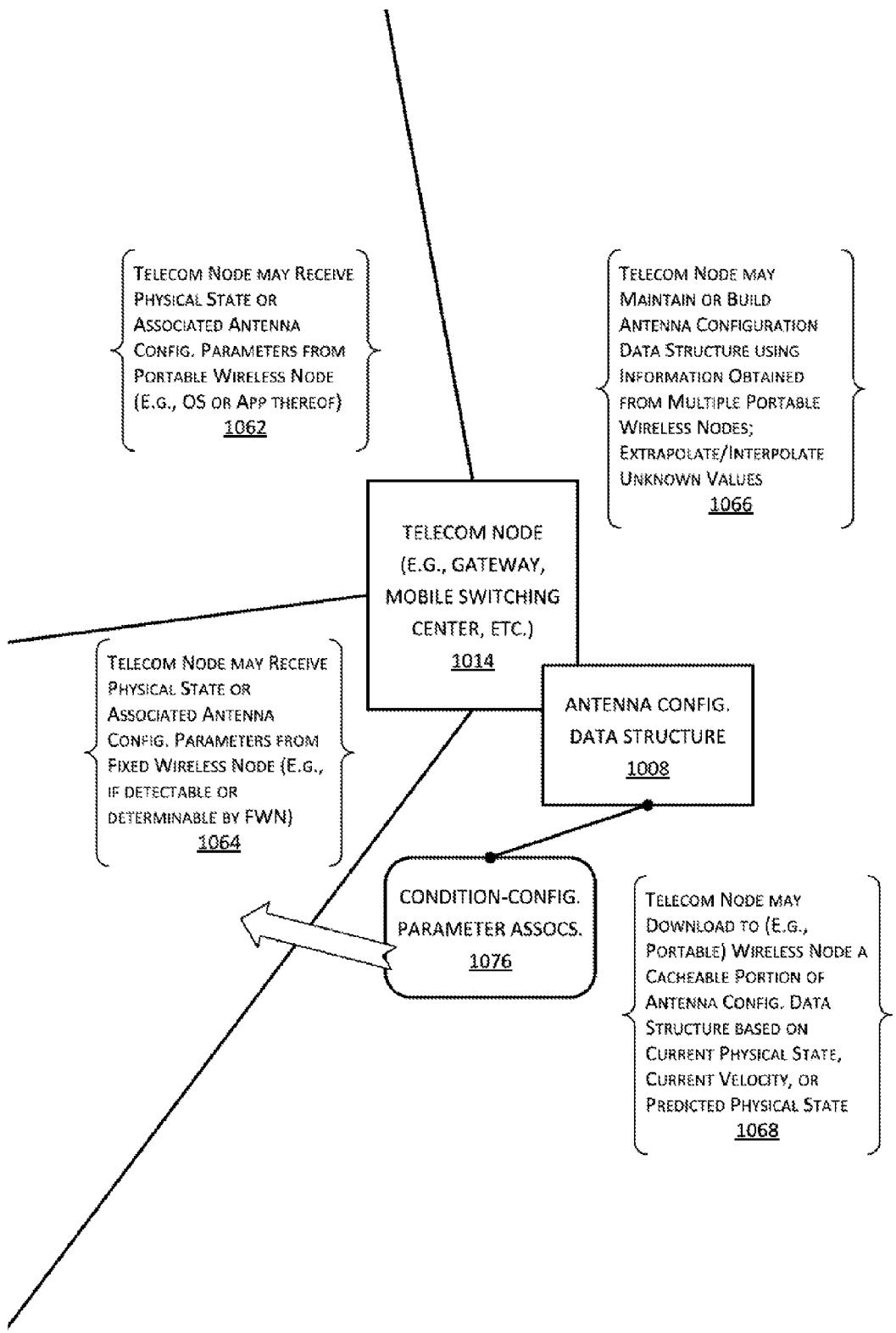
Figure 1I:
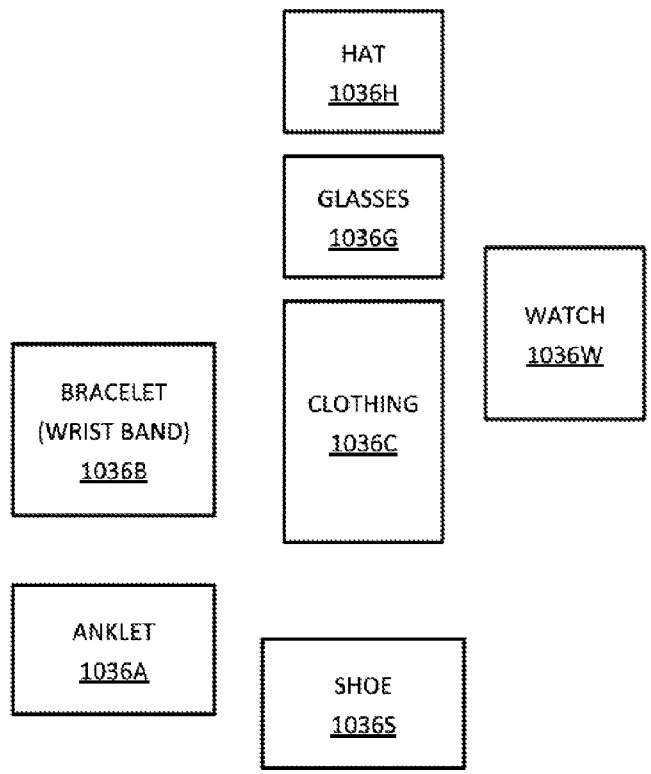
Figure 1I:
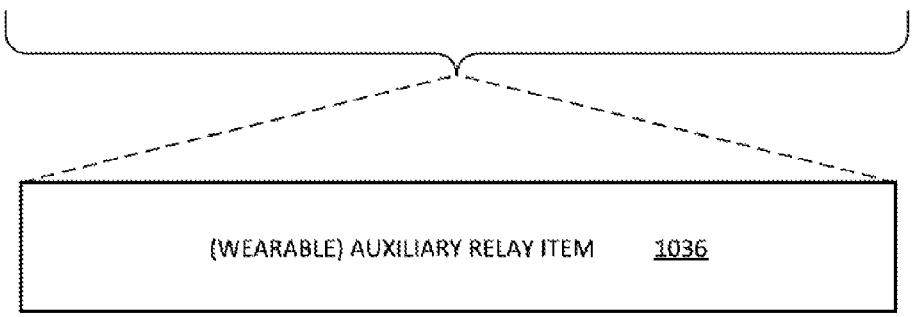
Figure 1I:
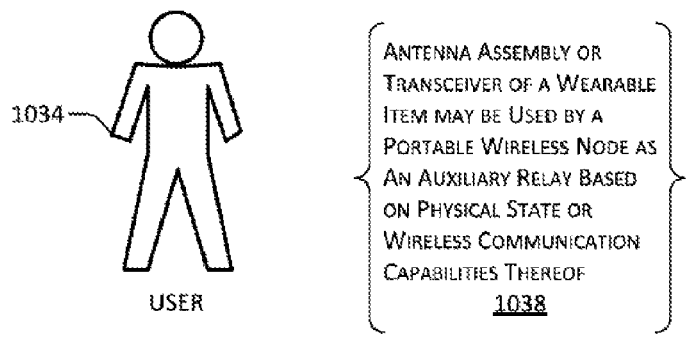
Figure 1J:
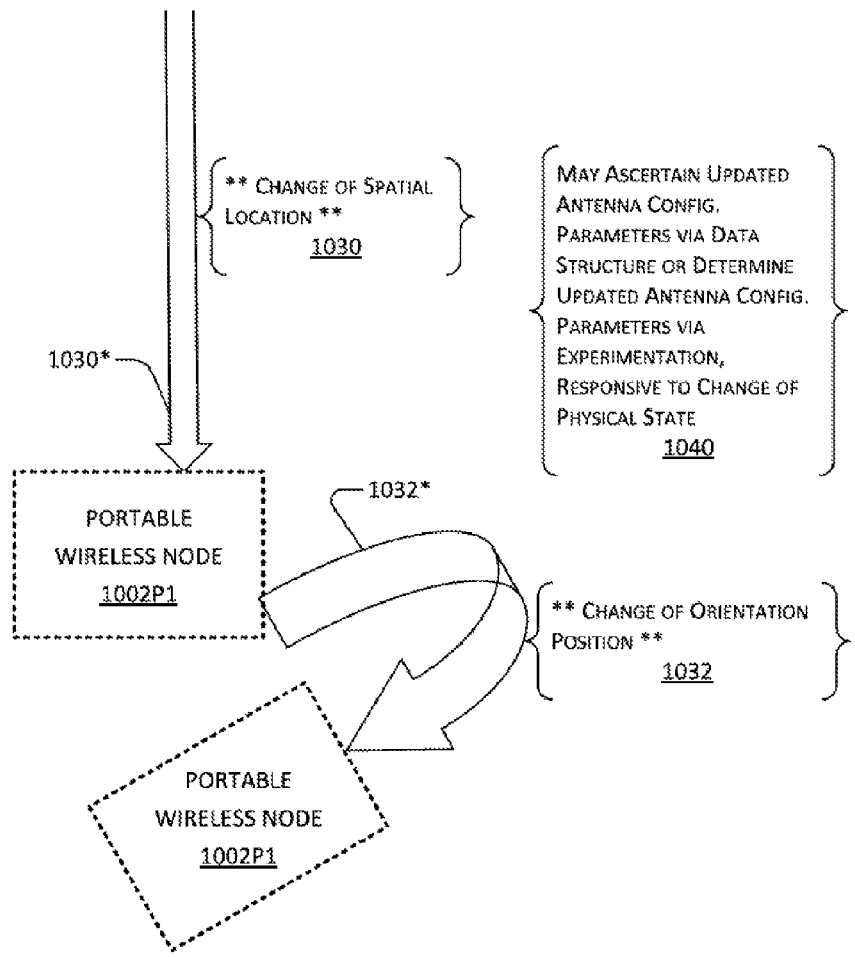

With reference to FIG. 1J, a wireless node, such as a portable wireless node 1002P1, may move or be moved. As represented by arrow 1030\*, portable wireless node 1002P1 may be translated in space from one point to another point. For certain example implementations, as indicated at description 1030, portable wireless node 1002P1 may experience a change of spatial location due to translational movement. As represented by arrow 1032\*, portable wireless node 1002P1 may be rotated in space from one angle to another angle. For certain example implementations, as indicated at description 1032, portable wireless node 1002P1 may experience a change of orientation position due to rotational movement. For certain example embodiments, a portable wireless node 1002P1 may change one or more antenna assembly configuration parameters 1070 based at least partly on at least one change to at least one condition 1072, such a change to its physical state (e.g., a translation causing a spatial location change, a rotation causing an orientation position change, or a combination thereof, etc.). For certain example implementations, as indicated at description 1040, a portable wireless node 1002P1 may ascertain one or more new, updated, or appropriate antenna assembly configuration parameters 1070 responsive to a physical state change via: applying one or more current conditions 1072 to at least one antenna configuration data structure 1008 to extract one or more antenna assembly configuration parameters 1070 that were previously stored in association with current conditions 1072, experimenting with different antenna assembly configuration parameters 1070 until suitable wireless communication channel capabilities are established or determined, some combination thereof, or so forth. However, claimed subject matter is not limited to any particular described embodiments, implementations, examples, etc.

For certain example embodiments, a data structure may link one or more wireless communication parameters with a given physical state of a mobile device. Thus, if a mobile device knows its spatial location (e.g., in terms of GPS coordinates or placement within a 3-D map of a building), a group of wireless communication parameters (e.g., a set of antenna elements and respective phase delays) to be adopted to communicate with a particular base station may be ascertained from data structure. For certain example implementations, an orientation of a mobile device may be part of an input physical state to ascertain associated wireless communication parameters (e.g., if an orientation is expected to be user-determined autonomously). Alternatively, an orientation of a mobile device may be part of a group of wireless communication parameters that are output based on an e.g. spatial location of a mobile device (e.g., if a mobile device is expected to indicate to a user a particular mobile-device-orientation offering enhanced communication—which may be especially pertinent, for instance, if a mobile device is not being held during use, such as when a user has a wired or wireless headset, or if a user is sitting in a chair that swivels).

For certain example embodiments, an antenna configuration data structure may include one or more entries having a physical state field that is associated with or linked to a field having a group of wireless communication parameters. However, a data structure may additionally or alternatively include one or more of the following conditions or potential inputs: (a) prediction of an upcoming physical state, (b) a power availability at a transmitter or a receiver (or a power usage constraint), (c) a spatial location (or orientation) of a base station, (d) an availability of one or more personal auxiliary relay items, (e) a time of day, (f) other, potentially-interfering wireless traffic that is known of through self-detection or notification, (g) an expected radio activity (e.g., is a data intensive activity, such as media streaming, anticipated?), (h) a device type for a mobile device, (i) one or more antenna characteristics of a mobile device (e.g., a feasible beam pattern, a polarization sensitivity, a frequency response, an impedance, or a combination thereof, etc.), (j) a frequency band, (k) a signal encoding, (l) one or more environmental factors (e.g., humidity—certain frequencies propagate less well than others in higher humidity (e.g., 50 GHz signals attenuate in the presence of water), temperature, physical barriers—stationary or moving, approaching devices, or a combination thereof, etc.), some combination thereof, or so forth. However, claimed subject matter is not limited to any particular described embodiments, implementations, examples, etc.

For certain example embodiments, a wireless node may develop an antenna configuration data structure. By way of example only, a wireless node may store or record a physical state along with a corresponding signal quality in association with each other in a data structure. A physical state may correspond to a currently-existing physical state, a recently-tested physical state, some combination thereof, or so forth. For certain example implementations, an updated association may be stored if there are certain amounts of change to (i) a physical state or (ii) signal quality or if a certain amount of (iii) time has elapsed, some combination thereof, or so forth. Additionally or alternatively, for certain example implementations, a wireless node may replace or add to an existing entry if a new group of wireless communication parameters are discovered for a given physical state that provides superior signal quality. For certain example implementations, an entry of an antenna configuration data structure may include a time stamp representing when a value was determining, a mobile device or device type identifier of a mobile device that determined or was a source of a value, some combination thereof, or so forth. However, claimed subject matter is not limited to any particular described embodiments, implementations, examples, etc.

For certain example embodiments, new values for entries may be determined via interpolation or extrapolation from values associated with other physical states. For example, if data is available (e.g., from experimentation in transmit or receive postures) with respect to multiple tested orientations, it may be predicted how well antenna elements (or other wireless communication parameters) will work at other orientations. Additionally or alternatively, if data is available with respect to multiple tested spatial locations (including if a 3-D map of a room is accessible or if know directional capabilities of an antenna), it may be predicted how well antenna elements (or other wireless communication parameters) will perform at other spatial locations. Even without a 3-D map, if there a sufficient number of measurements, then values for other, untested spatial locations may be predicted. For instance, if data values are available from several different paths taken by a mobile device around a room, then the mobile device can predict data values for other points in the room. For certain example implementations, one or more entries in an antenna configuration data structure may have an indicator that a value is predicted, an indicator that a value has a particular level of reliability, some combination thereof, or so forth.

For certain example embodiments, network-side actors may acquire, build, create, maintain, share, disseminate, or a combination thereof, etc. at least a portion of an antenna configuration data structure. Network-side actors may include, by way of example but not limitation, a cloud-based actor, an internet actor, a telecommunications service provider, a telecommunications equipment supplier, some combination thereof, or so forth. For certain example embodiments, network-side actors may acquire data fully or partially from a mobile device. For certain example implementations, the following data may be received from a mobile device: at least a portion of a physical state, one or more wireless communication parameters that were employed during the existence of the physical state, and corresponding signal quality. Additionally or alternatively, for certain example implementations, the following data may be received from a mobile device: physical state and wireless communication parameters that were employed during the existence of the physical state, and the following data may be received from a counterpart wireless node (such as a base station): signal quality based on a network-side reception.

For certain example embodiments, a network-side actor may send to a mobile device or a mobile device may receive from a network-side actor one or more portions of an antenna configuration data structure so as to download a cacheable part thereof. For certain example implementations, a part may be downloaded, or offered for download, based at least partially on any one or more of the following: (a) current spatial location; (b) physical state; (c) predicted spatial location; (d) predicted physical state; (e) device type, make, model, specifications, or combination thereof, etc. (such as memory capability, at least one user setting, or a specific physical antenna array traits, or a combination thereof, etc.); (f) a proximity to a boundary of current cached part (e.g., including, but not limited to, a consideration of predicted movement toward a boundary thereof); some combination thereof, or so forth.

With reference to FIG. 1I, a user 1034 (e.g., a person) may wear an auxiliary relay item 1036. For certain example embodiments, a (wearable) auxiliary relay item 1036 may be donned by, worn by, or adorning a person for protection, warmth, style, aesthetics, functionality, ornamentation, a combination thereof, or so forth. An auxiliary relay item 1036 may function to repeat a signal, expand antenna options, increase instantaneous transmit power, increase battery storage potential, a combination thereof, or so forth. Examples of auxiliary relay items 1036 may include, but are not limited to, a hat 1036H, glasses 1036G, clothing 1036C (e.g., pants, shirt, jacket, belt, dress, or a combination thereof, etc.), a shoe 1036S, a watch 1036W, a bracelet 1036B (including a wrist band), an anklet 1036A, some combination thereof, or so forth. For certain example implementations, as indicated at description 1038, an antenna assembly or a transceiver of a wearable auxiliary relay item 1036 may be used by a portable wireless node 1002P1 as a separate or additional node or path or option to propagate a signal based at least partially on a physical state of an auxiliary relay item, on wireless communication capabilities of an auxiliary relay item, some combination thereof, or so forth. By way of example only, if a portable wireless node does not have a clear (e.g., line-of-sight, unblocked, sufficiently non-attenuated, or a combination thereof, etc.) path to a targeted fixed wireless node but an auxiliary relay item does have a clear path, a (e.g., shorter-range, direct, clear path, or a combination thereof, etc.) signal may be established between the portable wireless node and the auxiliary relay item with the auxiliary relay item then handling a link/hop/step/etc. to the targeted fixed wireless node. However, claimed subject matter is not limited to any particular described embodiments, implementations, examples, etc.

For certain example embodiments, a portable wireless node may account for or address environmental factors or concerns pertinent to wireless communication at, e.g., EHF. For certain example implementations, to avoid transmission through a human body, human tissue (e.g., hand, head, or a combination thereof, etc.) may be detected using one or more of the following: (a) test beam emanation (e.g., analyze reflections from test beams), (b) a capacitive sensor (e.g., of a touchscreen), (c) a proximity detector (e.g., a light sensor), (d) a pressure sensor (e.g., determine where finger tips are placed), (e) a sound sensor (e.g., determine where a user's mouth is located), some combination thereof, or so forth.

For certain example embodiments, a portable wireless node may interact with at least one auxiliary relay item 1036. Examples may include, but are not limited to, a bracelet, an anklet, glasses, a watch, some combination thereof, or so forth. For certain example implementations, an auxiliary relay item 1036 may be engaged or utilized for any one or more of the following reasons: (a) a clearer path to another wireless node (e.g., to avoid a head or other human tissue or another blocking object), (b) more power availability, (c) more or differently-arranged antenna elements on the auxiliary relay item, (d) a different available frequency or wireless communication standard, some combination thereof, or so forth. By way of example only, a portable wireless node may roll over to an auxiliary relay item to relocate transmission power away from a head or if throughput drops where a user is currently holding a portable wireless node. For certain example implementations: (1) a portable wireless node may select between or among one or more auxiliary relay items (e.g., may determine when it is advisable to fallback to an auxiliary relay item using a protocol for communication between a mobile device and an auxiliary relay item); (2) an auxiliary relay item may be creating/using/updating an antenna configuration data structure in conjunction with or independent of a portable wireless node; (3) a spatial location of a wearable auxiliary relay item may be determine based at least partly on an attachment site to a body part; (4) a system may automatically determine presence/absence or location of wearable auxiliary relay items; (5) searches for suitable antenna configuration parameters by an auxiliary relay item may be constrained by battery power (e.g., power/battery-related technology described herein with respect to a portable wireless node may be applied to an auxiliary relay item, unless context dictates otherwise); (6) if multiple items are linked so as to enable or merely enhance communication or user functions if they are working together, then one or more of the multiple items may alert (e.g., visually, audibly, haptically, or a combination thereof, etc.) if they are separated from each other beyond a threshold distance (e.g., beyond a range which enables using them together, such as if a user is driving away from a house with one of two interacting components); some combination thereof; or so forth.

For certain example embodiments, technologies described herein may be directly apparent to a user in one or more ways. For certain example implementations, a portable wireless node may offer a user one or more settings: (a) a size of a data structure being cached, (b) a slider or other mechanism to indicate between battery consumption versus signal acquisition or enhancement, (c) a slider or other mechanism to indicate between an acceptable energy radiation level (e.g., exposure to a body or head portion thereof) versus signal quality or bandwidth throughput, (d) ability to activate/sync/configure an auxiliary relay item (e.g., input a type), some combination thereof, or so forth. For certain example implementations, a user may indicate a desire to be notified of (e.g., via at least one setting): (a) a position or orientation option for a portable wireless node that offers improved communication (e.g., more bandwidth, less power, less interference, lower cost, or a combination thereof, etc.), (b) an impending signal loss (e.g., if movement continues along a current direction based on signal degradation or entries in an antenna configuration data structure), some combination thereof, or so forth. For certain example implementations, notifications may be delivered by a portable wireless node to a user audibly, haptically, visually, or a combination thereof, etc. for indicating a different position/orientation, impending signal loss, some combination thereof, or so forth.

With reference to FIG. 1F, two or more portable wireless nodes, such as a first portable wireless node 1002P1 and a second portable wireless node 1002P2, may be in proximity to each other. For example, portable wireless node 1002P1 may be sufficiently close to portable wireless node 1002P2 so that wireless communication there between may be effectuated without propagating messages or signals over the internet or over a telecommunications network. For certain example embodiments, two or more portable wireless nodes may share antenna assembly configuration parameters 1070 with each other. For certain example implementations, as indicated at description 1052, two or more portable wireless nodes may share at least a portion of a respective antenna configuration data structure 1008 locally with each other. By way of example only, portable wireless nodes may share associations stored in an antenna configuration data structure 1008 using a peer-to-peer (P2P) mechanism. Local communication may include, but is not limited to, using Bluetooth®, near-field communication (NFC), ad hoc Wi-Fi between two portable wireless nodes, a common Wi-Fi access point, a mesh network, some combination thereof, or so forth. Additionally or alternatively, two or more portable wireless nodes, such as a first portable wireless node 1002P1 and a second portable wireless node 1002P2, may share at least a portion of an antenna configuration data structure 1008 over an internet, a telecommunications network, some combination thereof, or so forth. However, claimed subject matter is not limited to any particular described embodiments, implementations, examples, etc.

With reference to FIGS. 1F and 1G, a portable wireless node 1002P1 is depicted as being capable of communicating with a fixed wireless node 1002F2 or a fixed wireless node 1002F1 via at least one wireless link 1004. For certain example implementations, as indicated at description 1060, two or more wireless nodes 1002P or 1002F may negotiate one or more wireless communication configuration parameters (e.g., frequency, directionality, physical state, antenna settings, a bank shot that reflects a signal propagating between two nodes off of an object, wireless standard employed, or a combination thereof, etc.), including but not limited to at least one antenna assembly configuration parameter 1070. However, claimed subject matter is not limited to any particular described embodiments, implementations, examples, etc.

For certain example embodiments, an antenna configuration data structure 1008 may be created, maintained, stored, updated, disseminated, some combination thereof, or so forth by an entity other than a portable wireless node. By way of example only, an antenna configuration data structure 1008 may be centrally orchestrated by an internet company or cloud service provider (e.g., see FIGS. 1G and 1D) or by a telecommunications company or cellular service provider (e.g., see FIGS. 1G and 1H). It should be understood that a data structure may be centrally orchestrated without being completely stored or processed in one location. For instance, processing or storage may be physically or logically distributed for efficiency, scalability, cost, redundancy, reliability, etc. while an overall data structure orchestration is centrally controlled. Additionally or alternatively, two or more entities may jointly orchestrate a data structure in a centralized fashion in relative to numerous distributed users or beneficiaries thereof, such as multiple portable wireless nodes. However, claimed subject matter is not limited to any particular described embodiments, implementations, examples, etc.

With reference to FIG. 1G, an antenna configuration data structure 1008 may be centrally orchestrated in conjunction with multiple portable wireless nodes. For certain example implementations, as indicated at description 1042, wireless portable nodes may obtain (e.g., retrieve, receive, acquire via push or pull, or a combination thereof, etc.) at least a portion of an antenna configuration data structure 1008 from a centralized location (e.g., from a telecom node 1014, an internet node 1016, or a combination thereof, etc.). A portable wireless node may obtain (e.g., on-demand, prospectively, predictively, upon request, if an orchestrating entity detects conditions are exceeding a previously-sent portion, or a combination thereof, etc.) a portion of an antenna configuration data structure 1008 to cache the portion for utilization as conditions 1072 (e.g., of FIG. 1E) warrant. However, claimed subject matter is not limited to any particular described embodiments, implementations, examples, etc.

With continuing reference to FIG. 1G, portable wireless nodes may interact with a data structure orchestrator to facilitate a centralized antenna configuration data structure 1008. For certain example embodiments, a portable wireless node may send conditions and associated antenna configuration parameters 1074 (e.g., an entry having at least two fields from an antenna configuration data structure 1008 of portable wireless node 1002P1) toward a data structure orchestrator of a telecom node 1014, an internet node 1016, some combination thereof, or so forth. For certain example implementations, as indicated at description 1058, portable wireless node may (e.g., automatically, at regular intervals, if connected to external power, if connected to a high-bandwidth channel, if connected over a free or low-cost channel, upon request, at scheduled times, or a combination thereof, etc.) send (e.g., using an OS, an app, or a combination thereof, etc.) a physical state and antenna assembly configuration parameters that are associated with the physical state to an antenna configuration data structure facilitated by a central orchestrator. In return, wireless portable nodes may obtain one or more condition-configuration parameter associations 1076 as at least a portion of a centralized antenna configuration data structure 1008 from a centralized orchestrator. However, claimed subject matter is not limited to any particular described embodiments, implementations, examples, etc.

For certain example embodiments, communications between a portable wireless node and a telecom node 1014 or an internet node 1016 may be effectuated via one or more fixed wireless nodes, such as a fixed wireless node 1002F1 or a fixed wireless node 1002F2, respectively. For certain example implementations, as indicated at description 1054, a fixed wireless node 1002F2, such as a Wi-Fi access point (including but not limited to Gigabit Wi-Fi) or a wireless entry point to the internet that bypasses cellular infrastructure, may propagate information for or portions of an antenna configuration data structure 1008 upstream or downstream. For certain example implementations, as indicated at description 1056, a fixed wireless node 1002F1, such as a cellular base station (e.g., a base transceiver station (BTS), radio base station (RBS), node B, eNB, base station subsystem, or a combination thereof, etc.), may propagate information for or portions of an antenna configuration data structure 1008 upstream or downstream. However, claimed subject matter is not limited to any particular described embodiments, implementations, examples, etc.

With reference to FIGS. 1G and 1D, a fixed wireless node 1002F2 is shown coupled to a network 1018 (e.g., an intranet, an internet, or a combination thereof, etc.). For certain example embodiments, fixed wireless node 1002F2 may forward conditions and associated configuration parameters 1074 from a portable wireless node 1002P1 to an Internet node 1016 via a network 1018. By way of example but not limitation, an Internet node 1016 may include or comprise one or more servers, one or more server blades, one or more cloud-supporting computing devices, a server farm, distributed cloud computing resources, some combination thereof, or so forth. For certain example implementations, as indicated at description 1046, an Internet node 1016 may receive physical state or associated antenna configuration parameters from one or more portable wireless nodes (e.g., via an OS or an app thereof). However, claimed subject matter is not limited to any particular described embodiments, implementations, examples, etc.

With continuing reference to FIG. 1D, Internet node 1016 is shown including, storing, having access to, or a combination thereof, etc. at least one antenna configuration data structure 1008. For certain example implementations, as indicated at description 1048, an Internet node 1016 may create, maintain, build, orchestrate, or a combination thereof, etc. at least one antenna configuration data structure 1008 using information (e.g., conditions and associated configuration parameters 1074) obtained from one or more portable wireless nodes, such as portable wireless node 1002P1. Additionally or alternatively, unknown values (e.g., antenna assembly configuration parameters) in an antenna configuration data structure 1008 may be interpolated or extrapolated using known values having associated conditions that are above, below, surrounding, or a combination thereof, etc. the condition or conditions associated with the configuration parameters being interpolated or extrapolated. For certain example embodiments, at least a portion of an antenna configuration data structure 1008 may be linked to or merged with a physical map (e.g., a geographical map, a building map, or a combination thereof, etc.), a radio map (e.g., a map having indications of relative radio signal strengths or other radio signal characteristics), some combination thereof, or so forth. However, claimed subject matter is not limited to any particular described embodiments, implementations, examples, etc.

With continuing reference to FIG. 1D, for certain example embodiments, an internet node 1016 may send one or more condition-configuration parameter associations 1076 toward at least one portable wireless node. By way of example only, at least one condition-configuration parameter association 1076 may be sent from an antenna configuration data structure 1008 to a portable wireless node 1002P1 via a network 1018 or a fixed wireless node 1002F2 or a wireless link 1004. For certain example implementations, as indicated at description 1050, an internet node 1016 may download to a (e.g., portable) wireless node 1002 at least a cacheable portion of an antenna configuration data structure 1008 based at least partially on a current physical state, a current velocity, a predicted physical state, a current connection cost, a current connection type or speed, a current battery level or power source, or a combination thereof, etc. of a receiving wireless node 1002. Although not explicitly illustrated, an internet node 1016 may communicate with a portable wireless node 1002P1 at least partly via a fixed wireless node 1002F1 or a telecom node 1014. However, claimed subject matter is not limited to any particular described embodiments, implementations, examples, etc.

With reference to FIGS. 1G and 1H, a fixed wireless node 1002F1 is shown coupled to a telecom node 1014. For certain example embodiments, fixed wireless node 1002F1 may forward conditions and associated configuration parameters 1074 from a portable wireless node 1002P1 to a telecom node 104 directly or via one or more intervening nodes or networks. Although not explicitly shown in FIG. 1G or 1H, a backhaul between fixed wireless node 1002F1 and a telecom node 1014 may include one or more nodes of a telecommunications network (e.g., a base station subsystem (BSS), a base station controller (BSC), a network management system node, a mobile switching center, a media gateway, home/visitor location register node, or a combination thereof, etc.), an internet protocol (IP) network portion, an internet portion, some combination thereof, or so forth. By way of example but not limitation, a telecom node 1014 may include or comprise one or more servers, a mobile switching center (MSC), a gateway, a media gateway, a network switching subsystem, an MSC server (MSS), one or more cloud computing devices, a node that is co-located with or at least partly integrated with a fixed wireless node (e.g., a BSS, a BSC, or a combination thereof, etc.), some combination thereof, or so forth. For certain example implementations, as indicated at description 1062, a telecom node 1014 may receive physical state or associated antenna configuration parameters from one or more portable wireless nodes (e.g., via an OS or an app or underlying operational code, such as a BIOS, thereof). Additionally or alternatively, for certain example implementations, as indicated at description 1064, a telecom node 1014 may receive physical state or associated antenna configuration parameters from one or more fixed wireless nodes (i) that pertain to a counterpart portable wireless node (e.g., if detectable by a fixed wireless node during receiving from a counterpart portable wireless node or if determinable by a fixed wireless node responsive to handshaking or other communication negotiation with a counterpart portable wireless node) or (ii) that pertain to the fixed wireless node itself. However, claimed subject matter is not limited to any particular described embodiments, implementations, examples, etc.

With continuing reference to FIG. 1H, a telecom node 1014 is shown including, storing, having access to, or a combination thereof, etc. at least one antenna configuration data structure 1008. For certain example implementations, as indicated at description 1066, a telecom node 1014 may create, maintain, build, orchestrate, or a combination thereof, etc. at least one antenna configuration data structure 1008 using information (e.g., conditions and associated configuration parameters 1074) obtained from one or more portable wireless nodes, such as portable wireless node 1002P1. Additionally or alternatively, unknown values (e.g., antenna assembly configuration parameters) in an antenna configuration data structure 1008 may be interpolated or extrapolated using known values having associated conditions that are above, below, surrounding, or a combination thereof, etc. the condition or conditions associated with the configuration parameters being interpolated or extrapolated. For certain example embodiments, at least a portion of an antenna configuration data structure 1008 may be linked to or merged with a physical map (e.g., a geographical map, a building map, or a combination thereof, etc.), a radio map (e.g., a map having indications of relative radio signal strengths or other radio signal characteristics), some combination thereof, or so forth. However, claimed subject matter is not limited to any particular described embodiments, implementations, examples, etc.

With continuing reference to FIG. 1H, for certain example embodiments, a telecom node 1014 may send one or more condition-configuration parameter associations 1076 toward at least one portable wireless node. By way of example only, at least one condition-configuration parameter association 1076 may be sent from an antenna configuration data structure 1008 to a portable wireless node 1002P1 via at least a fixed wireless node 1002F1 or a wireless link 1004. For certain example implementations, as indicated at description 1068, a telecom node 1014 may download to a (e.g., portable) wireless node 1002 at least a cacheable portion of an antenna configuration data structure 1008 based at least partially on a current physical state, a current velocity, a predicted physical state, a current connection cost, a current connection type or speed, a current battery level or power source, or a combination thereof, etc. of a receiving wireless node 1002. Although not explicitly illustrated, a telecom node 1014 may communicate with a portable wireless node 1002P1 at least partly via a fixed wireless node 1002F2 or a network 1018 (or an internet node 1016). However, claimed subject matter is not limited to any particular described embodiments, implementations, examples, etc.

Figure 1K:
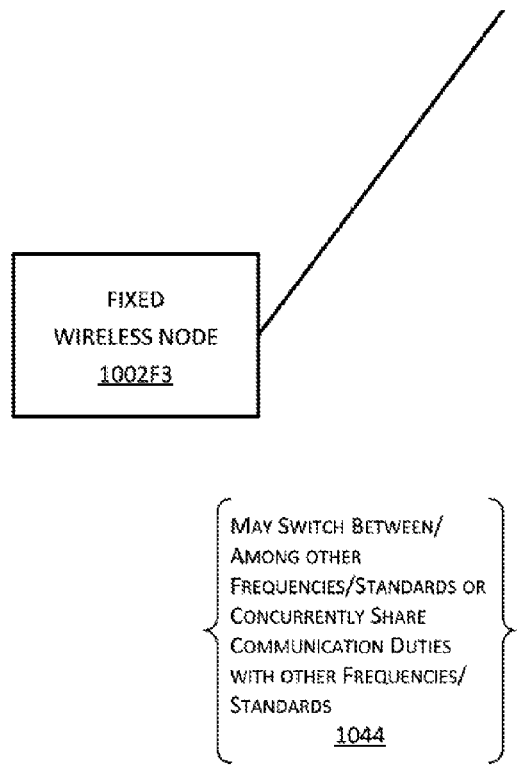
Figure 1L:
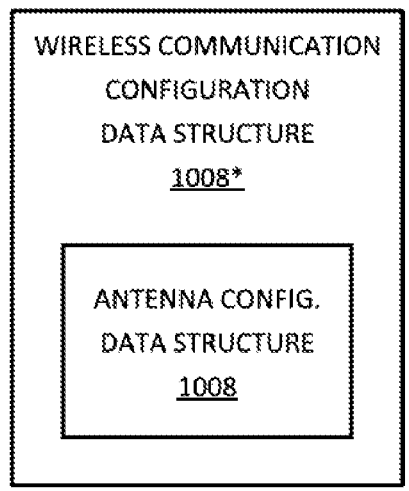

With reference to FIG. 1K, a fixed wireless node 1002F3 is coupled to a telecom node 1014 (e.g., of FIG. 1H). Although fixed wireless node 1002F1 (e.g., of FIG. 1G) and fixed wireless node 1002F3 are illustrated as being coupled to a same telecom node 1014, they may alternatively be coupled to one or more different telecom nodes. For certain example embodiments, fixed wireless node 1002F3 may be operating under at least one different wireless standard in comparison to fixed wireless node 1002F1. For certain example implementations, as indicated at description 1044, a portable wireless node 1002P1 or a fixed wireless node 1002F3 may switch between or among other frequencies or wireless standards or concurrently share communication duties with other frequencies or wireless standards (e.g., a portable wireless node 1002P1 may simultaneously or in a time-switching manner transceive on at least two frequencies or in accordance with at least two wireless standards). However, claimed subject matter is not limited to any particular described embodiments, implementations, examples, etc.

For certain example embodiments, a wireless communication configuration data structure 1008* may include an antenna configuration data structure 1008. For certain example implementations, a wireless communication configuration data structure 1008* may include one or more conditions or one or more wireless communication parameters in addition to or in the alternative to conditions 1072 or antenna assembly configuration parameters 1070, respectively, of an antenna configuration data structure 1008. Although not explicitly illustrated in FIGS. 1A-1L, portable wireless nodes 1002P, fixed wireless nodes 1002F, telecom nodes 1012, internet nodes 1014, combinations thereof, or so forth may utilize, build, manipulate, or a combination thereof, etc. a wireless communication configuration data structure 1008* in manners, with techniques, or using approaches that are at least similar or analogous to those for an antenna configuration data structure 1008. However, claimed subject matter is not limited to any particular described embodiments, implementations, examples, etc.

For certain example embodiments, an extremely high frequency (EHF) communication (e.g., at 30-300 GHz, such as at 60 GHz in accordance with IEEE 802.11ad) may be conducted by wireless node that is also capable of utilizing other frequency bands or other wireless communication standards. To facilitate such interoperability, a wireless node may determine (i) whether or when to switch to another frequency band or another wireless communication standard or (ii) whether or when to share bandwidth demands with another frequency band or another wireless communication standard. For certain example implementations, other frequency bands may include, but are not limited to, (a) 2.4 GHz, 3.6 GHz, 5 GHz, or a combination thereof, etc.; (b) 700/800 MHz, 900 MHz, 1800 MHZ, 1700/1900 MHz, 2500 MHz, 2600 MHz, or a combination thereof, etc.; some combination thereof; or so forth. For certain example implementations, other wireless communication standards may include, but are not limited to, (a) IEEE 802.11b, 802.11g, 802.11a, 802.11n, 802.11ac, or a combination thereof, etc.; (b) GSM/EDGE, CDMA, UMTS/HSPA, LTE, WiMAX, or a combination thereof, etc.; some combination thereof; or so forth. However, claimed subject matter is not limited to any particular described embodiments, implementations, examples, etc.

For certain example embodiments, a wireless node 1002 may choose to switch frequency or wireless standard or may choose to share communication across two or more frequencies or wireless standards. For certain example implementations, one or more of a number of factors may be considered for switching versus sharing decisions. First, a wireless node may switch if another frequency band or standard can handle current bandwidth demands while a current one cannot. Second, a wireless node may switch if another frequency band or standard has a lower, or at least no higher, cost. Third, a wireless node may switch if a current frequency is experiencing attenuation but another frequency is likely not to experience the same attenuation (e.g., if body tissue is currently attenuating a 60 GHz signal, but a mobile device can switch to a lower frequency signal below 10 GHz). Fourth, a wireless node may share bandwidth demands if a current frequency or standard is not providing a sufficiently fast or strong connection, but another frequency or standard has a higher cost or insufficient bandwidth capability to meet current bandwidth demands. Additional or alternative factors for deciding between switching and sharing may be considered. For certain example implementations, one or more of a number of factors may prompt a wireless node to consider sharing or switching. First, a signal quality may drop below a threshold using a current frequency or standard. Second, no group of wireless communication parameters offering superior performance may be determinable by a wireless node via experimentation. Third, no entry in a wireless communication configuration data structure for a current or impending physical state (or set of conditions generally) may be ascertained. Additional or alternative factors for deciding whether to consider switching versus sharing may be incorporated into a wireless node's automation. However, claimed subject matter is not limited to any particular described embodiments, implementations, examples, etc.

For certain example embodiments, a coordinated management system may be implemented where multiple wireless nodes occupy a given physical region, with the management system coordinating various signal strengths, antenna directions, polarizations, features, some combination thereof, or so forth. Coordination may enable a greater number of nodes within or a more efficient use of available spectrum within a given physical region. However, claimed subject matter is not limited to any particular described embodiments, implementations, examples, etc.

For certain example embodiments, a coordinated management system may be constituted in a centralized or a distributed manner. For a centralized coordinated management system, in accordance with certain example implementations, an access point, a base station, a mobile switching center, a fixed wireless node, an internet node, a telecom node, or a combination thereof, etc. may coordinate a number of portable wireless nodes across a single "cell" or multiple cells. For a distributed coordinated management system, in accordance with certain example implementations, two or more portable wireless nodes, separately from or in conjunction with at least one network-infrastructure-based node—such as a fixed wireless node or a telecom node or an internet node, may coordinate their own individual wireless signals. Coordination may be based at least partially on their own sensor readings, including but not limited to received signals, or based at least partially on using coordination-specific data received from or exchanged with other portable wireless nodes or with a fixed wireless nodes, such as a base station. For a hybrid coordinated management system, in accordance with certain example implementations, there may be some decentralized efforts by portable wireless nodes with overarching efforts by one or more network-infrastructure-based nodes for centralized oversight. However, claimed subject matter is not limited to any particular described embodiments, implementations, examples, etc.

For certain example embodiments, one or more factors may be separately or jointly considered in conjunction with, or as part of, an analysis to facilitate coordination. First, available frequency bands (in a given region or to a particular portable wireless node) may be considered. Different bands have different amounts or levels of absorption or other loss, dispersion, scattering, reflection, some combination thereof, or so forth. By way of example only, 60 GHz typically has more attenuation than 5 GHz. Thus, although 60 GHz generally propagates a relatively shorter distance, it can correspondingly be reused in smaller spaces. At 60 GHz, reflections may enable "bank shots" off of proximate objects. Two devices may determine to perform a bank shot via negotiation, or a centralized coordinator may order them to perform one. Furthermore, devices transmitting at higher frequencies may utilize smaller antenna elements that accommodate their smaller/shorter wavelengths. A physical size of a particular wavelength aperture may generally be smaller at higher frequencies. Relatively smaller devices can therefore implement beamforming at 60 GHz, for example, even if they would be unable to do so at 1800 MHz, or even 5 GHz. Second, governmental restrictions may be considered. Statutes, regulations, or a combination thereof, etc. may stipulate or require certain transmission maximums or reception capabilities. By way of example only, a signal strength may be limited at particular frequencies. Third, licensing constraints (e.g., with regard to available frequencies or particular uses thereof) may be considered. Licensing constraints may flow from a governmental entity, from a corporation to a mobile device or mobile device user (e.g., contractual obligations), some combination thereof, or so forth. Fourth, different or particular device types in a given physical region that are trying to share spectrum may be considered. For example, "permanent" characteristics may be considered: (a) antenna features (e.g., beam pattern capabilities, polarization sensitivity, frequency response, impedance, or a combination thereof, etc.), (b) processing capability, some combination thereof, or so forth. As another example, current settings of a device (e.g., user-established settings, OS-specified settings, app-determined settings, or a combination thereof, etc.) may be considered: (a) frequency selection from among multiple possible frequencies, (b) signal encoding selection from among multiple possible encoding schemes, (c) user-imposed restraints (e.g., based on cost, power, battery life, or a combination thereof, etc.), some combination thereof, or so forth. As yet another example, current status levels or conditions of a device may be considered: (a) signal to noise ratio (SNR), (b) signal strength, (c) power constraints or battery status, (d) available processing bandwidth, (e) location, (f) expected radio activity level (such as whether an activity is anticipated to be data intensive (e.g. media streaming)), (g) orientation, (h) operating state (e.g., connected to a Wi-Fi network or not, access through near field communication (NFC), or a combination thereof, etc.), some combination thereof, or so forth. Fifth, environmental characteristics may be considered. For example, physical barriers (e.g., walls, trees, billboards, etc.; those obtainable from one or more maps (such as Google Earth or crowd-sourced 3-D building data); or a combination thereof; etc.) may be considered. Other environmental characteristics may include, but are not limited to, other approaching devices (e.g., their locations or transmitting characteristics), humidity, temperature, some combination thereof, or so forth. However, claimed subject matter is not limited to any particular described embodiments, implementations, examples, etc.

For certain example embodiments, coordination opportunities may include, but are not limited to, bank shots or beamforming. First, bank shots may be planned or implemented between at least two wireless nodes to avoid a wall or other obstacle, if a vehicle is detected to be approaching and will be temporarily block a line-of-sight transmission path, some combination thereof, or so forth. Second, beamforming may be achieved with, by way of example but not limitation, an antenna with multiple elements, a phased array, a meta-material antenna, some combination thereof, or so forth. An aimed beam may reach a target with less relative power (e.g., in comparison to an omnidirectional transmission a beam may reach a further distance (with a narrower footprint) using a same power level). Further with respect to coordination, an omnidirectional transmission may be used if a target or counterpart wireless node is moving (or if a transmitting node is moving), but beamforming may be used if a target is stationary (or slowly moving) (or if a transmitting node is not moving). Aiming a beam may be accomplished through "trial and error". As a first example, multiple beams may be sent out (e.g., fully or partially simultaneously or over time) with different indicators, and an intended recipient may be asked for an indicator that they received strongest to determine a good beam pattern for that recipient. As a second example, two nodes may send out beams until they connect. As a third example, a wireless node may sweep beams circularly until a directional angle (e.g., azimuth angle) is discovered that makes contact with an intended wireless target, and a wireless node may then slice up or down until it hones in to find an elevation or a zenith angle. However, claimed subject matter is not limited to any particular described embodiments, implementations, examples, etc.

Figure 2:
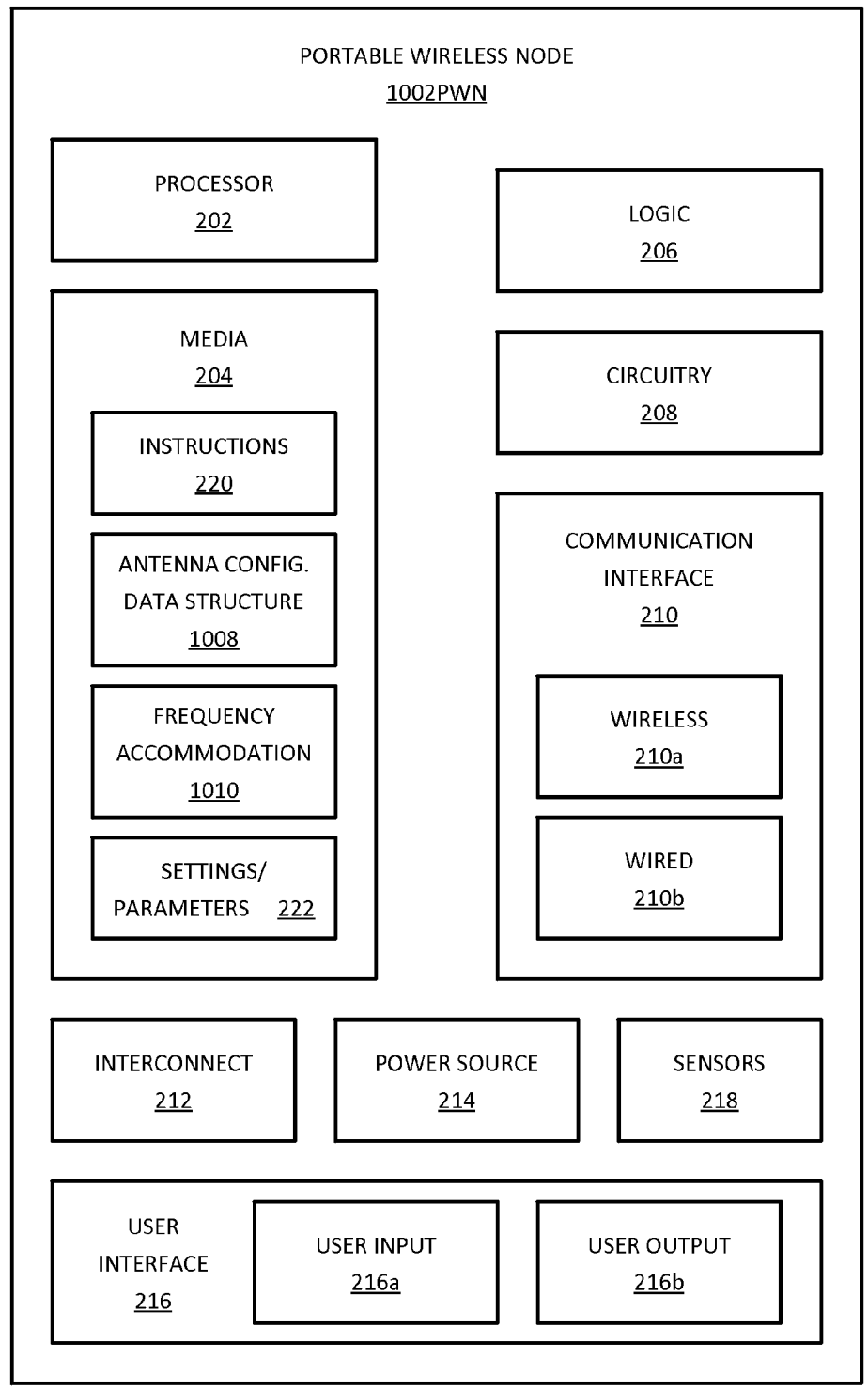
FIG. 2 is a schematic diagram of an example portable wireless node including one or more example components in accordance with certain example embodiments.

FIG. 2 is a schematic diagram 200 of an example portable wireless node including one or more example components in accordance with certain example embodiments. As shown in FIG. 2, a portable wireless node 1002PWN may include one or more components such as: at least one processor 202, one or more media 204, logic 206, circuitry 208, at least one communication interface 210, at least one interconnect 212, at least one power source 214, at least one user interface 216, one or more sensors 218, some combination thereof, or so forth. Furthermore, as shown in schematic diagram 200, one or more media 204 may include one or more instructions 220, at least one antenna configuration data structure 1008, at least one frequency accommodation module 1010, one or more settings or parameters 222, some combination thereof, or so forth; a communication interface 210 may include at least one wireless communication interface 210a, at least one wired communication interface 210b, some combination thereof, or so forth; or a user interface 216 may include at least one user input interface 216a, at least one user output interface 216b, some combination thereof, or so forth. However, a portable wireless node 1002PWN may alternatively include more, fewer, or different component(s) from those that are illustrated without departing from claimed subject matter.

For certain example embodiments, a portable wireless node 1002PWN may include or comprise at least one electronic device. Portable wireless node 1002PWN may include, for example, a computing platform or any electronic device having at least one processor or memory. Processor 202 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, one or more processing cores, discrete/fixed logic circuitry, controllers, micro-controllers, microprocessors, some combination thereof, or so forth. Media 204 may bear, store, contain, include, provide access to, or a combination thereof, etc. instructions 220, which may be executable by a processor 202; at least one antenna configuration data structure 1008; at least one frequency accommodation module 1010; one or more settings/parameters 222; some combination thereof; or so forth. Instructions 220 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 204 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, at least one antenna configuration data structure, at least one frequency accommodation module, one or more settings, one or more parameters, some combination thereof, or so forth.

For certain example embodiments, execution of instructions 220 by one or more processors 202 may transform at least a portion of at least one portable wireless node 1002PWN into a special-purpose computing device, apparatus, platform, machine, some combination thereof, or so forth. Instructions 220 or at least one frequency accommodation module 1010 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. An antenna configuration data structure 1008 may include entries or associations as described herein (media 204 may also or instead include or comprise a wireless communication configuration data structure 1008*). Settings/parameters 222 may include, by way of example but not limitation, one or more settings or parameters that may be established or determined by a user or other entity, one or more or settings or parameters that may be determined or detected by a portable wireless node 1002PWN, one or more settings or parameters that may be received from another device that determined or detected them, one or more settings or parameters that may determine at least partly how a portable wireless node 1002PWN is to operate or respond to a situation or a frequency accommodation scenario, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 222 may control at least partially how at least one antenna configuration data structure 1008 is configured, stored, shared, used, applied, some combination thereof, or so forth. Additionally or alternatively, at least a portion of settings/parameters 222 may be at least partially integrated with at least one frequency accommodation module 1010.

For certain example embodiments, logic 206 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 208 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 208 includes at least one physical or hardware component or aspect.

For certain example embodiments, one or more communication interfaces 210 may provide one or more interfaces between portable wireless node 1002PWN and another device or a person/operator. With respect to a person/operator, a communication interface 210 may include, by way of example but not limitation, a screen, a speaker, a keyboard or keys, a microphone, or other person-device input/output apparatuses. A wireless communication interface 210a or a wired communication interface 210b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, an infrared port, or a combination thereof, etc. to communicate wireless signals or wired signals via one or more wireless communication links 1004 or wired communication links, respectively, such as over at least one communication channel. Communications with at least one communication interface 210 may enable transmitting, receiving, or initiating of transmissions, just to name a few examples.

For certain example embodiments, at least one interconnect 212 may enable signal communication between or among components of portable wireless node 1002PWN. Interconnect 212 may include, by way of example but not limitation, one or more buses, channels, switching fabrics, some combination thereof, or so forth. Although not explicitly illustrated in FIG. 2, one or more components of portable wireless node 1002PWN may be coupled to interconnect 212 via a discrete or integrated interface. By way of example only, one or more interfaces may couple a communication interface 210 or a processor 202 to at least one interconnect 212. For certain example embodiments, at least one power source 214 may provide power to one or more components of portable wireless node 1002PWN. Power source 214 may include, by way of example but not limitation, a battery, a power connector, a solar power source or charger, a mechanical power source or charger, a fuel source, some combination thereof, or so forth.

For certain example embodiments, at least one sensor 218 may sense, produce, or otherwise provide at least one sensor value. Sensors 218 may include, by way of example only, a camera, a microphone, an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 218 may include, by way of example but not limitation, an image/video, a sound recording, an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, flex detections, some combination thereof, or so forth.

For certain example embodiments, a user interface 216 may enable one or more users to interact with portable wireless node 1002PWN. Interactions between a user and a portable wireless node may relate, by way of example but not limitation: to touch/tactile/feeling/haptic sensory (e.g., a user may shake, rotate, decline/incline, bend, twist, squeeze, or move a portable wireless node which may be detected by a gyroscope, an accelerometer, a compass, a MEMS, or a combination thereof, etc.; a user may press a button, slide a switch, rotate a knob, etc.; a user may touch a touch-sensitive screen; a device may vibrate; some combination thereof; or so forth), to sound/hearing/speech sensory (e.g., a user may speak into a microphone, a device may generate sounds via a speaker, or a combination thereof, etc.), to sights/vision sensory (e.g., a device may activate one or more lights, modify an image presented on a display screen, track a user's head/eye/hand movements, or a combination thereof, etc.), some combination thereof, or so forth.

For certain example embodiments, a user interface 216 may include a user input interface 216*a*, a user output interface 216*b*, some combination thereof, or so forth. A user input interface 216*a* may include, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, a virtual button/slider/keyboard/etc. presented on a touch-sensitive screen, some combination thereof, or so forth. A user output interface 216*b* may include, by way of example but not limitation, a speaker, a screen (e.g., with or without touch-sensitivity), a projector, a vibrating haptic feature, some combination thereof, or so forth. Certain user interfaces 216 may enable both user input and user output. For example, a touch-sensitive screen may be capable of providing user output and accepting user input. Additionally or alternatively, a user interface 216 component (e.g., that may be integrated with or separate from a portable wireless node 1002PWN), such as a headset that has a microphone and a speaker, may enable both user input and user output.

However, claimed subject matter is not limited to any particular described embodiments, implementations, examples, or so forth. For instance, it should be understood that for certain example implementations components that are illustrated separately in FIG. 2 may not necessarily be separate or mutually exclusive. For example, a given component may provide multiple functionalities. By way of example only, a single component such as a USB connector may function as a wired communication interface 210*b* or a power source 214. Additionally or alternatively, a single component such as a display screen may function as a communication interface 210 with respect to a user, as a user input interface 216*a*, or as a user output interface 216*b*. Additionally or alternatively, one or more instructions 220 may function to realize or embody at least part of a frequency accommodation module 1010 or at least one setting or parameter 222.

It should also be understood that for certain example implementations components that are illustrated in schematic diagram 200 or described herein may or may not be integral with or integrated into or onto a portable wireless node 1002PWN. For example, a component may be removably connected to a portable wireless node 1002PWN, a component may be wirelessly coupled to a portable wireless node 1002PWN, some combination thereof, or so forth. By way of example only, instructions 220 may be stored on a removable card having at least one medium 204. Additionally or alternatively, a user interface 216 (e.g., a wired or wireless headset, a screen, a video camera, a keyboard, or a combination thereof, etc.) or an auxiliary antenna wireless communication interface 210*a* may be coupled to a portable wireless node 1002PWN wirelessly or by wire. However, claimed subject matter is not limited to any particular described embodiments, implementations, examples, etc.

It should further be understood that, for certain example embodiments, at least a portion of one or more flow diagrams (e.g., operations thereof), methods, processes, procedures, operations, functionality, technology, mechanisms, or a combination thereof, etc. that are described herein or illustrated in the accompanying drawings (or disclosed by incorporated Applications) with respect to performance by a fixed wireless node 1002FWN may alternatively be performed, implemented, realized, or a combination thereof, etc. by a portable wireless node 1002PWN, unless context dictates otherwise. By way of example but not limitation, if a portable wireless node 1002PWN does not have a portion of an antenna configuration data structure 1008 or ad-hoc/real-time data on which to at least partially base an operation to be performed, it or they can be requested by a portable wireless node 1002PWN or otherwise delivered to a portable wireless node 1002PWN (e.g., via a communication interface 210) from a fixed wireless node 1002FWN, from another portable wireless node 1002PWN, from another device, from some combination thereof, or so forth. However, claimed subject matter is not limited to any particular described embodiments, implementations, examples, etc.

Figure 3:
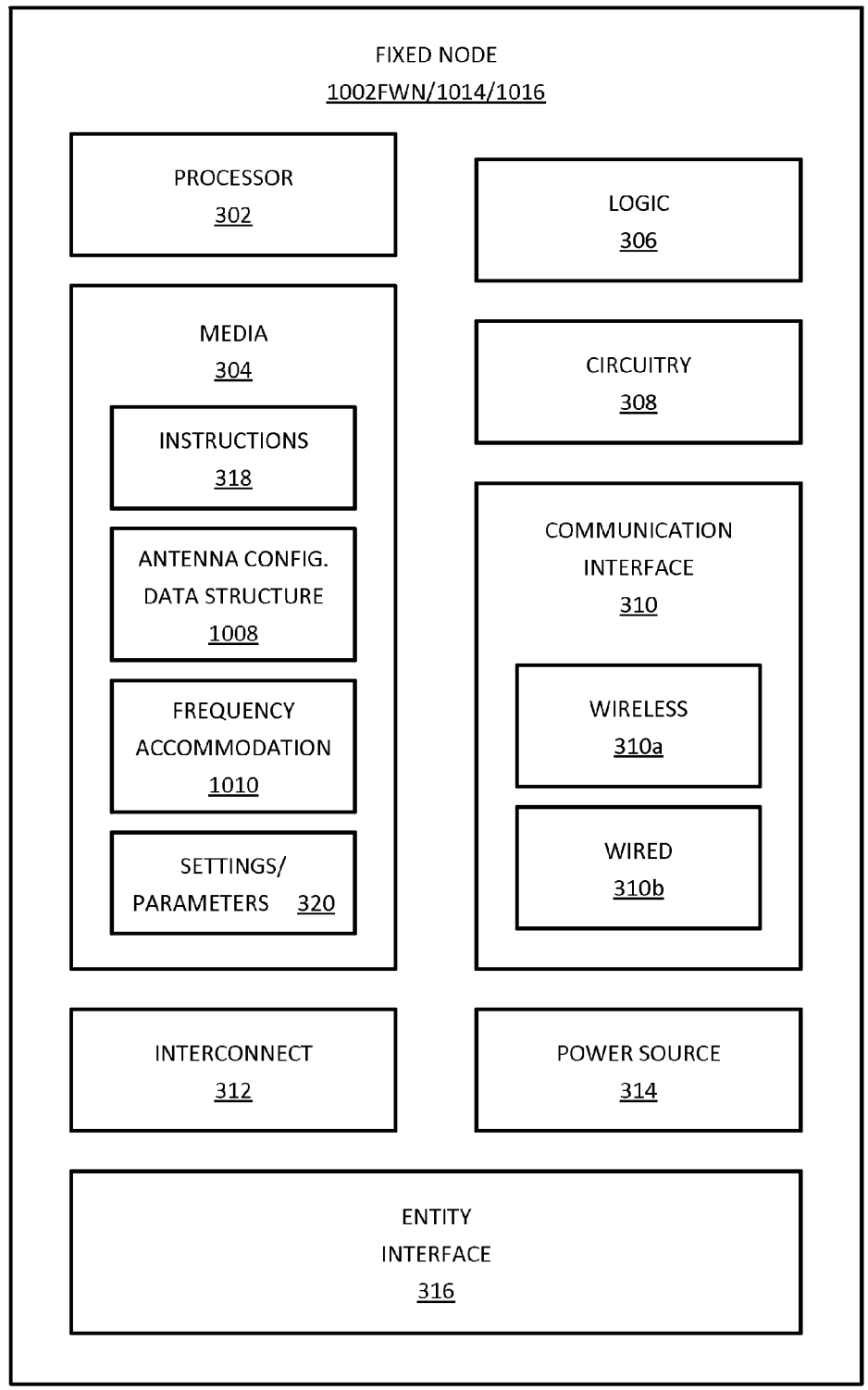
FIG. 3 is a schematic diagram of an example fixed node, such as a fixed wireless node or a fixed wired node, including one or more example components in accordance with certain example embodiments.

FIG. 3 is a schematic diagram 300 of an example fixed node, such as a fixed wireless node or a fixed wired node, including one or more example components in accordance with certain example embodiments. As shown in FIG. 3, a fixed node 1002FWN/1014/1016, such as a fixed wireless node 1002FWN or a fixed wired node (e.g., a telecom node 1014 or an internet node 1016), may include one or more components such as: at least one processor 302, one or more media 304, logic 306, circuitry 308, at least one communication interface 310, at least one interconnect 312, at least one power source 314, at least one entity interface 316, some combination thereof, or so forth. Furthermore, as shown in schematic diagram 300, one or more media 304 may include one or more instructions 318, at least one antenna configuration data structure 1008, at least one frequency accommodation module 1010, one or more settings or parameters 320, some combination thereof, or so forth; or communication interface 310 may include at least one wireless communication interface 310a, at least one wired communication interface 310b, some combination thereof, or so forth. However, a fixed node 1002FWN/1014/1016 may alternatively include more, fewer, or different component(s) from those that are illustrated without departing from claimed subject matter.

For certain example embodiments, a fixed node 1002FWN/1014/1016 may include or comprise at least one processing or computing device or machine. Fixed node 1002FWN/1014/1016 may include or comprise, for example, a computing platform or any electronic device or devices having at least one processor or memory. Processor 302 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, one or more processing cores, discrete/fixed logic circuitry, controllers, micro-controllers, microprocessors, some combination thereof, or so forth. Media 304 may bear, store, contain, include, provide access to, or a combination thereof, etc. instructions 318, which may be executable by a processor 302; at least one antenna configuration data structure 1008; at least one frequency accommodation module 1010; one or more settings/parameters 320; some combination thereof; or so forth. Instructions 318 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 304 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, at least one antenna configuration data structure, at least one frequency accommodation module, one or more settings, one or more parameters, some combination thereof, or so forth.

For certain example embodiments, execution of instructions 318 by one or more processors 302 may transform at least a portion of at least one fixed node 1002FWN/1014/1016 into a special-purpose computing device, apparatus, platform, machine, some combination thereof, or so forth. Instructions 318 or at least one frequency accommodation module 1010 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. An antenna configuration data structure 1008 may include entries or associations as described herein (media 304 may also or instead include or comprise a wireless communication configuration data structure 1008*). Settings/parameters 320 may include, by way of example but not limitation, one or more settings or parameters that may be established by a user or other entity, one or more settings or parameters that may be determined by a fixed node 1002FWN/1014/1016, one or more settings or parameters that may be determined by a user or other entity, one or more settings or parameters that may be detected by a fixed node 1002FWN/1014/1016, one or more settings or parameters that may be received from another device that detected them, one or more settings or parameters that may determine at least partly how a fixed node 1002FWN/1014/1016 is to operate or respond to a situation or a frequency accommodation scenario, one or more settings or parameters (e.g., values) that may be used to realize flow diagrams, methods, processes, procedures, operations, functionality, technology, mechanisms, or a combination thereof, etc. that are described herein or illustrated in the accompanying drawings. Settings/parameters 320 may control at least partially how at least one antenna configuration data structure 1008 is configured, stored, shared, used, applied, some combination thereof, or so forth. Additionally or alternatively, at least a portion of settings/parameters 320 may be at least partially integrated with at least one frequency accommodation module 1010. It should be understood that a frequency accommodation module 1010 of a portable wireless node 1002PWN (e.g., of FIG. 2) may differ from a frequency accommodation module 1010 of a fixed node 1002FWN/1014/1016.

For certain example embodiments, logic 306 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 308 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 308 includes at least one physical or hardware component or aspect.

For certain example embodiments, one or more communication interfaces 310 may provide one or more interfaces between fixed node 1002FWN/1014/1016 and another device or a person/operator/entity directly or indirectly. A wireless communication interface 310a or a wired communication interface 310b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links 1004 or wired communication links, respectively, such as over one or more communication channels. Communications with at least one communication interface 310 may enable transmitting, receiving, or initiating of transmissions, just to name a few examples.

For certain example embodiments, at least one interconnect 312 may enable signal communication between or among components of fixed node 1002FWN/1014/1016. Interconnect 312 may include, by way of example but not limitation, one or more buses, channels, switching fabrics, local area networks (LANs), storage area networks (SANs), some combination thereof, or so forth. Although not explicitly illustrated in FIG. 3, one or more components of fixed node 1002FWN/1014/1016 may be coupled to interconnect 312 via a discrete or integrated interface. By way of example only, one or more interfaces may couple a processor 302 or a medium 304 to at least one interconnect 312. For certain example embodiments, at least one power source 314 may provide power to one or more components of fixed node 1002FWN/1014/1016. Power source 314 may include, by way of example but not limitation, a power connector for accessing an electrical grid, a fuel cell, a solar power source, one or more batteries, some combination thereof, or so forth.

For certain example embodiments, an entity interface 316 may enable one or more entities (e.g., another device, a person, a group, an electronic agent, a robotic entity, or a combination thereof, etc.) to provide input to or receive output from fixed node 1002FWN/1014/1016. Interactions between an entity and a device may relate, by way of example but not limitation, to inputting or outputting instructions, commands, settings, parameters, indications or indicators, some combination thereof, or so forth. Certain entity interfaces 316 may enable both entity input and entity output at fixed node 1002FWN/1014/1016 or over at least one network link, such as one or more communication channels that may include network 1018.

However, claimed subject matter is not limited to any particular described embodiments, implementations, examples, or so forth. For instance, it should be understood that for certain example implementations components that are illustrated separately in FIG. 3 need not necessarily be separate or mutually exclusive. For example, a given component may provide multiple functionalities. By way of example only, hard-wired logic 306 may form circuitry 308. Additionally or alternatively, a single component such as a connector may function as a communication interface 310 or as an entity interface 316. Additionally or alternatively, one or more instructions 318 may function to realize or embody at least one frequency accommodation module 1010 or at least one setting or parameter 320.

It should also be understood that for certain example implementations components that are illustrated in schematic diagram 300 or described herein may not be integral or integrated with a fixed node 1002FWN/1014/1016. For example, a component may be removably connected to a fixed node 1002FWN/1014/1016, a component may be wirelessly coupled to a fixed node 1002FWN/1014/1016, one or more components of a fixed node 1002FWN/1014/1016 may be geographically distributed or separated from one another, some combination thereof, or so forth. By way of example only, instructions 318 may be stored on one medium 304, and settings/parameters 320 (or another portion of instructions 318) may be stored on a different medium 304, which may include a same server or a part of a different server of, e.g., a server farm. Additionally or alternatively, respective processor-media sets may be physically realized on different or respective server blades or server containers. Multiple server blades or containers, for instance, may be linked or interlinked to realize at least one fixed node 1002FWN/1014/1016. However, claimed subject matter is not limited to any particular described embodiments, implementations, examples, etc.

It should further be understood that, for certain example embodiments, at least a portion of one or more flow diagrams (e.g., operations thereof), methods, processes, procedures, operations, functionality, technology, mechanisms, or a combination thereof, etc. that are described herein or illustrated in the accompanying drawings (or disclosed by incorporated Applications) with respect to performance by a portable wireless node 1002PWN may alternatively be performed, implemented, realized, or a combination thereof, etc. by a fixed node 1002FWN/1014/1016, unless context dictates otherwise. By way of example but not limitation, if a fixed node 1002FWN/1014/1016 does not have a portion of an antenna configuration data structure 1008 or ad-hoc/real-time data on which to at least partially base an operation to be performed, it or they can be requested by a fixed node 1002FWN/1014/1016 or otherwise delivered to a fixed node 1002FWN/1014/1016 (e.g., via a communication interface 310) from a portable wireless node 1002PWN, from another fixed node 1002FWN/1014/1016, from another device, from some combination thereof, or so forth. However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.).

Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for frequency accommodation, the method comprising:
   obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, the experimentation including at least applying one or more different directionalities of one or more beams to determine suitability of the one or more antenna assembly configuration parameters; and
   associating the one or more antenna assembly configuration parameters with the at least one orientation position corresponding to the at least one portable wireless node.

2. A system for frequency accommodation, the system comprising:
   circuitry for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, the experimentation including at least applying one or more different directionalities of one or more beams to determine suitability of the one or more antenna assembly configuration parameters; and
   circuitry for associating the one or more antenna assembly configuration parameters with the at least one orientation position corresponding to the at least one portable wireless node.

3. The system of claim 2, wherein the circuitry for obtaining one or more antenna assembly configuration parameters and at least one orientation position corresponding to at least one portable wireless node comprises:
   at least one of:
   circuitry for ascertaining the one or more antenna assembly configuration parameters with respect to the at least one orientation position corresponding to the at least one portable wireless node based, at least partially, on experimentation with multiple antenna assembly configuration parameters;
   circuitry for receiving from at least one remote node the one or more antenna assembly configuration parameters with respect to the at least one orientation position corresponding to the at least one portable wireless node;
   circuitry for ascertaining the one or more antenna assembly configuration parameters for at least one range of values representing the at least one orientation position corresponding to the at least one portable wireless node; or
   circuitry for retrieving the one or more antenna assembly configuration parameters from at least one data structure stored at the at least one portable wireless node.

4. The system of claim 2, wherein the circuitry for obtaining one or more antenna assembly configuration parameters and at least one orientation position corresponding to at least one portable wireless node comprises:
   circuitry for receiving from at least one remote node one or more antenna assembly configuration parameters responsive at least partly to a transmission received by the at least one portable wireless node.

5. The system of claim 2, wherein the circuitry for associating the one or more antenna assembly configuration parameters with the at least one orientation position corresponding to the at least one portable wireless node comprises:
   at least one of:
   circuitry for storing the one or more antenna assembly configuration parameters in association with the at least one orientation position corresponding to the at least one portable wireless node as at least part of at least one entry of the antenna configuration data structure; or
   circuitry for transmitting to at least one remote node the one or more antenna assembly configuration parameters in association with the at least one orientation position corresponding to the at least one portable wireless node.

6. The system of claim 2, further comprising: circuitry for utilizing the one or more antenna assembly configuration parameters
   in conjunction with at least one antenna assembly.

7. The system of claim 2, further comprising: circuitry for receiving, by at least one network node, one or more conditions with associated with wireless communication configuration parameters from one or more portable wireless nodes.

8. The system of claim 2, further comprising: circuitry for extracting, by at least one network node, the one or more antenna
assembly configuration parameters from at least the antenna configuration data structure by applying the at least one orientation position.

9. The system of claim 2, further comprising: circuitry for transmitting from at least one network node to one or more portable
wireless nodes the one or more antenna assembly configuration parameters in association with the at least one orientation position corresponding to the at least one portable wireless node.

10. The system of claim 2, further comprising: circuitry for storing into at least one data structure, by at least one network node,
the one or more antenna assembly configuration parameters in association with the at least one orientation position corresponding to the at least one portable wireless node.

11. The system of claim 10, wherein the circuitry for storing into at least one data structure, by at least one network node, the one or more antenna assembly configuration parameters in association with the at least one orientation position corresponding to the at least one portable wireless node comprises: circuitry for storing the one or more antenna assembly configuration parameters
in association with the at least one orientation position corresponding to the at least one portable wireless node into the at least one data structure with regard to at least one device attribute of the at least one portable wireless node.

12. The system of claim 2, further comprising: circuitry for linking, by at least one network node, the one or more antenna
assembly configuration parameters that are associated with the at least one orientation position corresponding to the at least one portable wireless node with geospatial map data that includes multiple spatial locations.

13. The system of claim 2, further comprising: circuitry for presenting at least one interface to facilitate implementation of an antenna assembly configuration parameter framework.

14. The system of claim 13, further comprising: circuitry for communicating with at least one remote node to share the one or
more antenna assembly configuration parameters that are associated with the at least one orientation position corresponding to the at least one portable wireless node.

15. The system of claim 2, wherein the circuitry for obtaining one or more antenna assembly configuration parameters and at least one orientation position corresponding to at least one portable wireless node comprises:
at least one of:
circuitry for obtaining the one or more antenna assembly configuration parameters and the at least one orientation position corresponding to the at least one portable wireless node responsive at least partly to at least one command received from at least one remote node; or
circuitry for obtaining the one or more antenna assembly configuration parameters and the at least one orientation position corresponding to the at least one portable wireless node responsive at least partly to at least one criterion received from at least one remote node.

16. The system of claim 2, wherein the circuitry for associating the one or more antenna assembly configuration parameters with the at least one orientation position corresponding to the at least one portable wireless node comprises:
circuitry for transmitting the one or more antenna assembly configuration parameters (i) in association with the at least one orientation position corresponding to the at least one portable wireless node and (ii) in association with at least one spatial location corresponding to the at least one portable wireless node.

17. The system of claim 2, wherein the circuitry for obtaining one or more antenna assembly configuration parameters and at least one orientation position corresponding to at least one portable wireless node comprises:
circuitry for receiving the one or more antenna assembly configuration parameters and at least a reference to the at least one orientation position corresponding to the at least one portable wireless node from a fixed wireless node over a local wireless network.

18. The system of claim 2, wherein the circuitry for obtaining one or more antenna assembly configuration parameters and at least one orientation position corresponding to at least one portable wireless node comprises:
circuitry for receiving the one or more antenna assembly configuration parameters and at least one indication of the at least one orientation position corresponding to the at least one portable wireless node from another portable wireless node.

19. The system of claim 2, wherein the circuitry for obtaining one or more antenna assembly configuration parameters and at least one orientation position corresponding to at least one portable wireless node comprises:
circuitry for transmitting to another portable wireless node at least one indication of at least part of a physical state corresponding to the at least one portable wireless node as at least part of at least one request for the one or more antenna assembly configuration parameters.

20. The system of claim 2, further comprising: circuitry for coordinating wireless communication of one or more portable wireless nodes.

21. The system of claim 20, wherein the circuitry for coordinating wireless communication of one or more portable wireless nodes comprises:
circuitry for assigning at least one of a time slot or a frequency to a particular portable wireless node of the one or more portable wireless nodes.

22. The system of claim 20, wherein the circuitry for coordinating wireless communication of one or more portable wireless nodes comprises:
circuitry for instructing the one or more portable wireless nodes to point at least one beam in at least one particular direction based, at least partially, on one or more locations corresponding to the one or more portable wireless nodes.

23. The system of claim 2, further comprising: circuitry for negotiating at least one wireless communication bank shot with at
least one other wireless node.

24. The system of claim 23, wherein the circuitry for negotiating at least one wireless communication bank shot with at least one other wireless node comprises:

circuitry for negotiating at least one directionality for at least one antenna beam to implement the at least one wireless communication bank shot with the at least one other wireless node.

25. The system of claim 2, further comprising: circuitry for signaling, by at least one auxiliary relay item, that the at least one auxiliary relay item is available to the at least one portable wireless node.

26. The system of claim 2, further comprising: circuitry for receiving, by at least one auxiliary relay item from the at least one
portable wireless node, at least one request that the at least one auxiliary relay item report at least one measure of signal quality determinable by the at least one auxiliary relay item.

27. The system of claim 2, further comprising: circuitry for signaling, by at least one auxiliary relay item, at least one indication
of one or more communication avenues, including but not limited to at least one base station, that is wirelessly accessible to the at least one auxiliary relay item.

28. The system of claim 2, further comprising: circuitry, which is responsive at least partly to a change of physical state
corresponding to the at least one portable wireless node, for repeating at least one of (i) an obtainment of one or more antenna assembly configuration parameters and at least one orientation position corresponding to at least one portable wireless node or (ii) an association of the one or more antenna assembly configuration parameters with the at least one orientation position corresponding to the at least one portable wireless node.

29. The system of claim 2, further comprising: circuitry for obtaining one or more different antenna assembly configuration parameters.

30. The system of claim 29, wherein the circuitry for obtaining one or more different antenna assembly configuration parameters comprises:
circuitry for obtaining the one or more different antenna assembly configuration parameters responsive at least partly to expiration of at least one elapsed time.

31. The system of claim 2, further comprising: circuitry for determining at least one different orientation position for a current spatial location corresponding to the at least one portable wireless node.

32. The system of claim 31, wherein the circuitry for determining at least one different orientation position for a current spatial location corresponding to the at least one portable wireless node comprises:
circuitry for determining the at least one different orientation position for the current spatial location corresponding to the at least one portable wireless node using at least the antenna configuration data structure.

33. The system of claim 31, wherein the circuitry for determining at least one different orientation position for a current spatial location corresponding to the at least one portable wireless node comprises:
circuitry for indicating to a user of the at least one portable wireless node the at least one different orientation position.

34. The system of claim 2, wherein the circuitry for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, includes:
circuitry for obtaining the one or more antenna assembly configuration parameters and at least the one orientation position corresponding to at least the one portable wireless node, wherein the obtaining the one or more antenna assembly configuration parameters includes at least obtaining the one or more antenna assembly configuration parameters based on experimentation of the at least one portable wireless node, wherein detection of a drop in signal of at least the one portable wireless node initiates the experimentation.

35. The system of claim 2, wherein the circuitry for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, comprises:
circuitry for obtaining the one or more antenna assembly configuration parameters and the at least one orientation position corresponding to the at least one portable wireless node, wherein the obtaining the one or more antenna assembly configuration parameters includes at least obtaining the one or more antenna assembly configuration parameters based on the experimentation of the at least one portable wireless node, wherein detection of movement of the at least one portable wireless node initiates the experimentation and one or more results of the experimentation populate an antenna configuration data structure, the detection of the movement of the at least one portable wireless node being at least detection by an inertial measurement unit of the at least one portable wireless node.

36. The system of claim 2, wherein the circuitry for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, comprises:
circuitry for obtaining the one or more antenna assembly configuration parameters and the at least one orientation position corresponding to the at least one portable wireless node, wherein the obtaining the one or more antenna assembly configuration parameters includes at least obtaining the one or more antenna assembly configuration parameters based on the experimentation of the at least one portable wireless node, wherein detection of movement of the at least one portable wireless node initiates the experimentation and one or more results of the experimentation populate the antenna configuration data structure, the detection of the movement of the at least one portable wireless node including at least detection by GPS.

37. The system of claim 2, wherein the circuitry for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, comprises:
   circuitry for obtaining the one or more antenna assembly configuration parameters and the at least one orientation position corresponding to the at least one portable wireless node, wherein the obtaining the one or more antenna assembly configuration parameters includes at least obtaining the one or more antenna assembly configuration parameters based on the experimentation of the at least one portable wireless node, wherein detection of movement of the at least one portable wireless node initiates the experimentation and one or more results of the experimentation populate the antenna configuration data structure, the experimentation being at least applying one or more different particular cardinal directionalities of one or more beams to determine suitability of the one or more antenna assembly configuration parameters.

38. The system of claim 2, wherein circuitry for obtaining one or more antenna assembly configuration parameters and at least one orientation position corresponding to at least one portable wireless node comprises:
   circuitry for obtaining one or more antenna assembly configuration parameters of an antenna at least one of formed or constructed using one or more meta-materials.

39. The system of claim 2, wherein circuitry for obtaining one or more antenna assembly configuration parameters and at least one orientation position corresponding to at least one portable wireless node comprises:
   circuitry for obtaining one or more antenna assembly configuration parameters of an antenna configured for communicating at approximately 60 GHz.

40. The system of claim 2, wherein obtaining the one or more antenna assembly configuration parameters based on experimentation of the at least one portable wireless node comprises:
   obtaining the one or more antenna assembly configuration parameters based on experimentation using current signaling of a counterpart wireless node.

41. The system of claim 2, wherein obtaining the one or more antenna assembly configuration parameters based on experimentation of the at least one portable wireless node comprises:
   obtaining the one or more antenna assembly configuration parameters based on experimentation using a map of an area to facilitate adjustment of one or more frequencies to overcome one or more obstacles.

42. The system of claim 2, wherein obtaining the one or more antenna assembly configuration parameters based on experimentation of the at least one portable wireless node comprises:
   obtaining the one or more antenna assembly configuration parameters based on experimentation including adjusting one or more frequencies to avoid one or more obstacles.

43. An arrangement for frequency accommodation, the arrangement comprising:
   means for obtaining one or more antenna assembly configuration parameters and at least one orientation position corresponding to at least one portable wireless node, wherein the obtaining the one or more antenna assembly configuration parameters includes at least obtaining the one or more antenna assembly configuration parameters based on experimentation of the at least one portable wireless node, wherein detection of movement of the at least one portable wireless node initiates the experimentation and one or more results of the experimentation populate an antenna configuration data structure, the experimentation including at least applying one or more different directionalities of one or more beams to determine suitability of the one or more antenna assembly configuration parameters; and
   means for associating the one or more antenna assembly configuration parameters with the at least one orientation position corresponding to the at least one portable wireless node.

* * * * *